United States Patent
Mitsushita

(10) Patent No.: US 6,693,634 B1
(45) Date of Patent: Feb. 17, 2004

(54) REDUCTION RATE PROCESSING CIRCUIT AND METHOD WITH LOGARITHMIC OPERATION AND IMAGE PROCESSOR EMPLOYING SAME

(75) Inventor: Tatsumi Mitsushita, Kanagawa (JP)

(73) Assignee: Sony Corporation, Tokyo (JP)

( * ) Notice: Subject to any disclaimer, the term of this patent is extended or adjusted under 35 U.S.C. 154(b) by 240 days.

(21) Appl. No.: 09/656,229

(22) Filed: Sep. 6, 2000

(30) Foreign Application Priority Data

Sep. 7, 1999 (JP) .......................................... P11-253469

(51) Int. Cl.[7] .............................................. G06T 11/40
(52) U.S. Cl. ........................ 345/428; 345/581; 345/582; 345/586
(58) Field of Search ................................ 345/582, 583, 345/660, 581, 428, 586, 588, 600, 605

(56) References Cited

U.S. PATENT DOCUMENTS

| | | | | |
|---|---|---|---|---|
| 5,471,572 A | * | 11/1995 | Buchner et al. ............. | 345/671 |
| 5,524,089 A | * | 6/1996 | Takano ........................ | 708/517 |
| 5,777,623 A | * | 7/1998 | Small .......................... | 345/586 |
| 5,819,017 A | * | 10/1998 | Akeley et al. ............... | 345/422 |
| 5,877,771 A | * | 3/1999 | Drebin et al. ................ | 345/586 |
| 5,943,058 A | * | 8/1999 | Nagy ........................... | 345/582 |
| 5,953,015 A | * | 9/1999 | Choi ........................... | 345/428 |
| 6,356,273 B1 | * | 3/2002 | Posniewski et al. ........ | 345/587 |
| 6,429,873 B1 | * | 8/2002 | Kacevas et al. ............ | 345/587 |
| 6,476,813 B1 | * | 11/2002 | Hansen ....................... | 345/427 |
| 6,476,818 B1 | * | 11/2002 | Ito .............................. | 345/569 |

\* cited by examiner

*Primary Examiner*—Matthew Luu
*Assistant Examiner*—Daniel J Chung
(74) *Attorney, Agent, or Firm*—Fulwider Patton Lee & Utecht, LLP

(57) ABSTRACT

A processing circuit capable of realizing an operation including a logarithm of 2 operation with a small scale circuit configuration, wherein a priority encoder and a shaft circuit normalize g data, a table outputs $\mu$="$\log_2(\{1, qm\})$–qm" corresponding to a mantissa qm, another shift circuit shifts data obtained by bit coupling a data maxe comprised by only an integer part and a $\mu$ data toward the MSB by L, another shift circuit shifts data obtained by bit coupling an exponent qe and the mantissa qm toward the MSB by L, an adder circuit adds $^-\delta 2$, $^-\gamma 2$, and {K, 3'b0, 10}, and a clamp circuit clamps the result of addition to a predetermined number of bits.

11 Claims, 11 Drawing Sheets

REDUCTION RATE PROCESSING CIRCUIT AND METHOD WITH LOGARITHMIC OPERATION AND IMAGE PROCESSOR EMPLOYING SAME

BACKGROUND OF THE INVENTION

1. Field of the Invention

The present invention relates to a processing circuit, a method for the same, and an image processor, more particularly relates to a processing circuit, a method for the same, and an image processor improved a speed of the processing including a logarithm of 2 operations and a reduction of scale of the hardware.

2. Description of the Related Art

Computer graphics are often used in a variety of computer aided design (CAD) systems and amusement machines. Especially, along with the recent advances in image processing techniques, systems using three-dimensional computer graphics are becoming rapidly widespread.

In three-dimensional computer graphics, the color value of each pixel is calculated at the time of deciding the color of each corresponding pixel. Then, rendering is performed for writing the calculated value to an address of a display buffer (frame buffer) corresponding to the pixel.

One of the rendering methods is polygon rendering. In this method, a three-dimensional model is expressed as a composite of triangular unit graphics (polygons). By drawing the polygons as units, the colors of the pixels of the display screen are decided.

In the polygon rendering, processing is performed for interpolation inside a triangle by the coordinates (x, y, z), color data (R, G, B), homogeneous coordinates (s, t) of texture data indicating an image pattern for pasting, and the value of a homogeneous term g for vertexes of the triangle in a physical coordinate system.

Here, simply speaking, the homogeneous term g is like an enlargement and reduction rate. The coordinates in a UV coordinate system of an actual texture buffer, that is, the texture coordinate data (U, V), correspond to the (s/q, t/q)=(u, v) obtained by dividing the homogeneous coordinates (s, t) by the homogeneous term g multiplied by the texture sizes USIZE and VSIZE.

In a three-dimensional computer graphic system using such polygon rendering, when drawing, a texture mapping is performed to read texture data having the optimum reduction rate from the texture buffer storing a plurality of texture data corresponding to different reduction rates, pasting this read texture data to the surface of the 3D model in units of pixels, and thereby obtaining image data with a high reality.

At this time, the reduction rate of the texture data to be read is determined in for example pixel units.

Summarizing the problem to be solved by the invention, in the three dimensional computer graphic system as mentioned above, how the reduction rate of the texture data to be read from the texture buffer is determined for each pixel is important for achieving a higher quality of the display image and a reduction of the scale.

SUMMARY OF THE INVENTION

An object of the present invention is to provide a processing circuit which can be used in an image processor such as a three-dimensional computer graphic system and other hardware and can realize processing including logarithm of 2 operations by a small sized circuit configuration.

Another object of the present invention is to provide an image processor capable of displaying a high quality image with a small size hardware configuration.

Still another object of the present invention is to provide a processing method capable of performing processing at a high speed.

To achieve the first object, according to a first aspect of the present invention, there is provided a processing circuit for performing the operation shown in the following equation (1)

$$M = \log_2 q + \text{maxe} \quad (1)$$

using binary data g having an integer part and a decimal part and data maxe comprised by only an integer part, comprising a normalization circuit for normalizing the data g to generate an exponent ge and a mantissa gm, a data outputting means for receiving as its input the mantissa gm and outputting data $\mu$ indicating "$\log_2(\{1, \text{qm}\}) - \text{qm}$" where $\{1, \text{qm}\}$ indicates a bit coupling where "1" is the integer part and "qm" is the decimal part, and an adder circuit for adding data obtained by bit coupling of the data ge and the gm and data obtained by bit coupling of the data maxe and the data $\mu$.

That is, in the processing circuit of the first aspect of the present invention, the normalization circuit normalizes the data g to generate the exponent ge and the manitssa gm.

Next, it outputs the mantissa gm to the data outputting means. The data outputting means obtains the data $\mu$ indicating "$\log_2(\{1, \text{qm}\}) - \text{qm}$" corresponding to the mantissa gm and outputs the data $\mu$.

Next, the adder circuit adds the data obtained by bit coupling of the data ge and gm and the data obtained by bit coupling of the data maxe and the data $\mu$ to calculate data M.

The processing circuit of the first aspect of the present invention utilizes the fact that the data $\mu$ is comprised by only the decimal part since $\log_2(\{1, \text{qm}\})$ and the data gm are similar, bit couples the data maxe comprised by only the integer part and the data $\mu$, and thus realizes addition of the data maxe. For this reason, the addition using the adder circuit can be reduced, and a reduction of the size and the increase of the speed can be achieved.

In the processing circuit of the first aspect of the present invention, preferably the data outputting means has a correspondence table between the mantissa gm and the $\mu$ data, acquires the data $\mu$ corresponding to an input mantissa gm by using the correspondence table, and outputs the related obtained data $\mu$.

Further, in the processing circuit of the first aspect of the present invention, preferably the data outputting means has a program for receiving as input the mantissa gm and generating the $\mu$ data and performs processing based on the related program to acquire the data $\mu$ corresponding to an nput mantissa gm and output the related acquired data $\mu$.

To achieve the first object, according to a second aspect of the present invention, there is provided a processing circuit for calculating data LOD by performing the operation shown in the following equation (2).

$$\text{LOD} = \text{Clamp}(((\log_{12} 1/q) + \text{maxe}) \ll L + K) \quad (2)$$

using binary data g having an integer part and a decimal part, data maxe comprised by only an integer part, and data L and K, comprising a normalization circuit for normalizing the data g to generate an exponent ge and a mantissa gm, a first shift circuit for shifting the data obtained by bit coupling of the data ge and the gm toward the most significant bit (MSB) by exactly a value indicated by the data L, a first inversion circuit for inverting the output of the first shift circuit, a data outputting means for receiving as its input the mantissa gm and outputting data $\mu$ indicating "$\log_2(\{1, qm\})-qm$" where $\{1, qm\}$ indicates a bit coupling where "1" is the integer part and "qm" is the decimal part, a second shift circuit for shifting the data obtained by bit coupling of the data maxe and the data $\mu$ toward the MSB by exactly the value indicated by the data L, a second inversion circuit for inverting the output of the second shift circuit, an adder circuit for adding the data obtained by bit coupling of the data K and the binary number "10", an adder circuit for adding the output of the first shaft circuit and the output of the second shift circuit, and a clamp circuit for clamping the output of the adder circuit to a predetermined number of bits to generate the data LOD.

That is, in the processing circuit of the second aspect of the present invention, the normalization circuit normalizes the data g to generate the exponent ge and the mantissa gm.

Then, the data obtained by bit coupling of the data ge and gm is output to the first shaft circuit. The first shift circuit shifts the related data toward the MSB by exactly the value indicated by the data L.

Next, the first inversion circuit inverts the output of the first shift circuit.

Further, the data outputting means receives as input the mantissa gm and outputs the data $\mu$ indicating "$\log_2(\{1, qm\})-qm$" corresponding to the mantissa gm.

Then, the second shift circuit shirts the data obtained by bit coupling of the data maxe and the data $\mu$ toward the MSB by exactly the value indicated by the data L.

Next, the second inversion circuit inverts the output of the second shift circuit.

Then, the adder circuit adds the data obtained by bit coupling of the data K and the binary number "10", the output of the first shift circuit, and the output of the second shift circuit.

Next, the clamp circuit clamps the output of the adder circuit to a predetermined number of bits to generate the data LOD.

The processing circuit of the second aspect of the present invention utilizes the fact that the data $\mu$ is comprised by only the decimal part since $\log_2(\{1, qm\})$ and the data gm are similar, bit couples the data maxe comprised by only the integer part and the data $\mu$, and thus realizes addition of the data maxe. For this reason, the addition using the adder circuit can be reduced, and a reduction of the size and the increase of the speed can be achieved.

To achieve the second object, according to a third aspect of the present invention, there is provided a image processor for expressing a 3D model by a combination of a plurality of unit graphics to which common processing conditions apply, determining a reduction rate from homogeneous coordinates (s, t) and a homogeneous term g contained in the image data for each pixel, and linking texture data according to the related determined reduction rate with the unit graphics, comprising a storing means storing a plurality of texture data corresponding to different reduction rates, a representative point determining circuit for determining a pixel forming a representative point from among pixels located inside a unit graphic to be processed among a plurality of pixels to be simultaneously processed, a reduction rate calculation circuit for calculating a reduction rate LOD from the following equation (3)

$$\text{LOD} = \text{Clamp } (((\log_2 1/q) + \text{maxe}) << L + K) \quad (3)$$

using data maxe comprised by only an integer part indicating a maximum exponent of homogeneous coordinates (s, t) of the vertexes of a unit graphic being processed and the homogeneous term g, the homogeneous term g having an integer part and a decimal part corresponding to the determining representative point, and the data L and K, and a reading circuit for reading texture data from the storing means by using the calculated reduction rate LOD, wherein the reduction rate calculation circuit has a normalization circuit for normalizing the data g to generate an exponent ge and a mantissa gm, a first shift circuit for shifting the data obtained by bit coupling of the data ge and the gm toward the MSB by exactly the value indicated by the data L, a first inversion circuit for inverting the output of the first shift circuit, a data outputting means for receiving as its input the mantissa gm and outputting data $\mu$ indicating "$\log_2(\{1, qm\})-qm$" where $\{1, qm\}$ indicates a bit coupling where "1" is the integer part and "qm" is the decimal part, a second shift circuit for shifting the data obtained by bit coupling of the data maxe and the data $\mu$ toward the MSB by exactly the value indicated by the data L, a second inversion circuit for inverting the output of the second shift circuit, and adder circuit for adding the data obtained by bit coupling of the data K and the binary number "10", an adder circuit for adding the output of the first shift circuit and the output of the second shift circuit, and a clamp circuit for clamping the output of the adder circuit to a predetermined number of bits to generate the data LOD.

That is, in the image processor of the third aspect according to the present invention, the representative point determining circuit determines the pixel forming the representative point from among the pixels located inside a unit graphic to be processed among a plurality of pixels to be processed at the same time.

Next, the reduction rate calculation circuit calculates the reduction rate LOD from the above equation (3) using the data maxe comprised by only an integer part indicating the maximum exponent of homogeneous coordinates (s, t) of the vertexes of the unit graphic being processed and the homogeneous term g, the homogeneous term g having an integer part and a decimal part corresponding to the determined representative point, and the data L and K, The mode of operation of the reduction rate calculation in the related reduction rate calculation circuit is the same as that in the processing circuit of the second aspect of the present invention.

Next, the reading circuit reads the texture data from the storing means by using the calculated reduction rate LOD.

According to a fourth aspect of the present invention, there is provided an image processor for expressing a 3D model by a combination of a plurality of unit graphics to which common processing conditions apply, determining a reduction rate from homogeneous coordinates (s, t) and a homogeneous term g contained in the image data for each pixel, and linking texture data according to the related determined reduction rate with the unit graphics, comprising a storing means storing a plurality of texture data corresponding to different reduction rates, a representative point determining circuit for determining a pixel forming a representative point from among pixels located inside a unit graphic to be processed among a plurality of pixels to be simultaneously processed, a reduction rate calculation circuit for calculating a reduction rate LOD from the following equation (4)

$$\text{LOD} + \text{Clamp } (((\log_2 1/q) + \text{maxe}) << L + K) \quad (4)$$

using data maxe comprised by only an integer part indicating a maximum exponent of homogeneous coordinates (s, t) of the vertexes of a unit graphic being processed and the homogeneous term g, the homogeneous term g having an integer part and a decimal part corresponding to the determined representative point, and the data L and K, and a reading circuit for reading texture data from the storing means by using the calculated reduction rate LOD, wherein the reduction rate calculation circuit has a normalization circuit for normalizing the data g to generate an exponent ge and a mantissa gm, a data outputting means for receiving as its input the mantissa gm and outputting data b indicating "$\log_2(\{1, qm\})$" where $\{1, qm\}$ indicates a bit coupling where "1" is the integer part and "qm" is the decimal part, a first inversion circuit for inverting the data obtained by bit coupling of the data ge and the data b, a second inversion circuit for inverting the data maxe, a first adder circuit for adding the binary number data "10", the output of the first inversion circuit, and the output of the second inversion circuit, a shift circuit for shifting the output of the first adder circuit toward the MSB by exactly the value indicating by the data L, a second adder circuit for adding the output of the shift circuit and the data K, and a clamp circuit for clamping the output of the adder circuit to a predetermined number of bits to generate the data LOD.

That is, in the image processor of the fourth aspect according to the present invention, the reduction rate calculation circuit calculates the reduction rate LOD as indicated below.

Namely, the normalization circuit normalizes the data g to generate the exponent ge and the mantissa gm.

Then, the data outputting means receives as its input the mantissa gm and outputs the data b indicating "$\log_2(\{1, qm\})$".

Next, the first inversion circuit inverts the data obtained by bit coupling of the data ge and the data b.

Further, the second inversion circuit inverts the data maxe.

Next, the first adder circuit adds the binary data "10", the output of the first inversion circuit, and the output of the second inversion circuit.

Then, the shift circuit shifts the output of the first adder circuit toward the MSB by exactly the value indicated by the data L.

Next, the second adder circuit adds the output of the first shift circuit and the data K.

Next, the clamp circuit clamps the output of the second adder circuit to a predetermined number of bits to generate the reduction rate LOD.

To achieve the third object, according to a fifth aspect of the present invention, there is provided a processing method for performing the operation shown in the following equation (5)

$$M = \log_2 q + \text{maxe} \quad (5)$$

using binary data g having an integer part and a decimal part and data maxe comprised by only an integer part, comprising normalizing the data g to generate an exponent ge and a mantissa gm, acquiring data $\mu$ indicating "$\log_2(\{1, qm\}) - qm$", where $\{1, qm\}$ indicates a bit coupling where "1" is the integer part and "qm" is the decimal part, corresponding to the mantissa gm by using a correspondence table between the mantissa gm and the data $\mu$ or a program for generating the data $\mu$ by inputting the mantissa gm, and adding the data obtained by bit coupling of the data ge and gm and the data obtained by bit coupling of the data maxe and the data $\mu$ to calculate the data M.

BRIEF DESCRIPTION OF THE DRAWINGS

The above objects and features of the present invention will be more apparent from the following description of the preferred embodiments with reference to the accompanying drawings, wherein.

DESCRIPTION OF THE PREFERRED EMBODIMENTS

Below, an explanation will be made of preferred embodiments with reference to a case where a division circuit of the present invention is applied to a three-dimensional computer graphic system for displaying an intended three-dimensional image of any three-dimensional object model on a cathode ray tube (CRT) or other display at a high speed such as applied to a home game system or the like.

Figure 1:
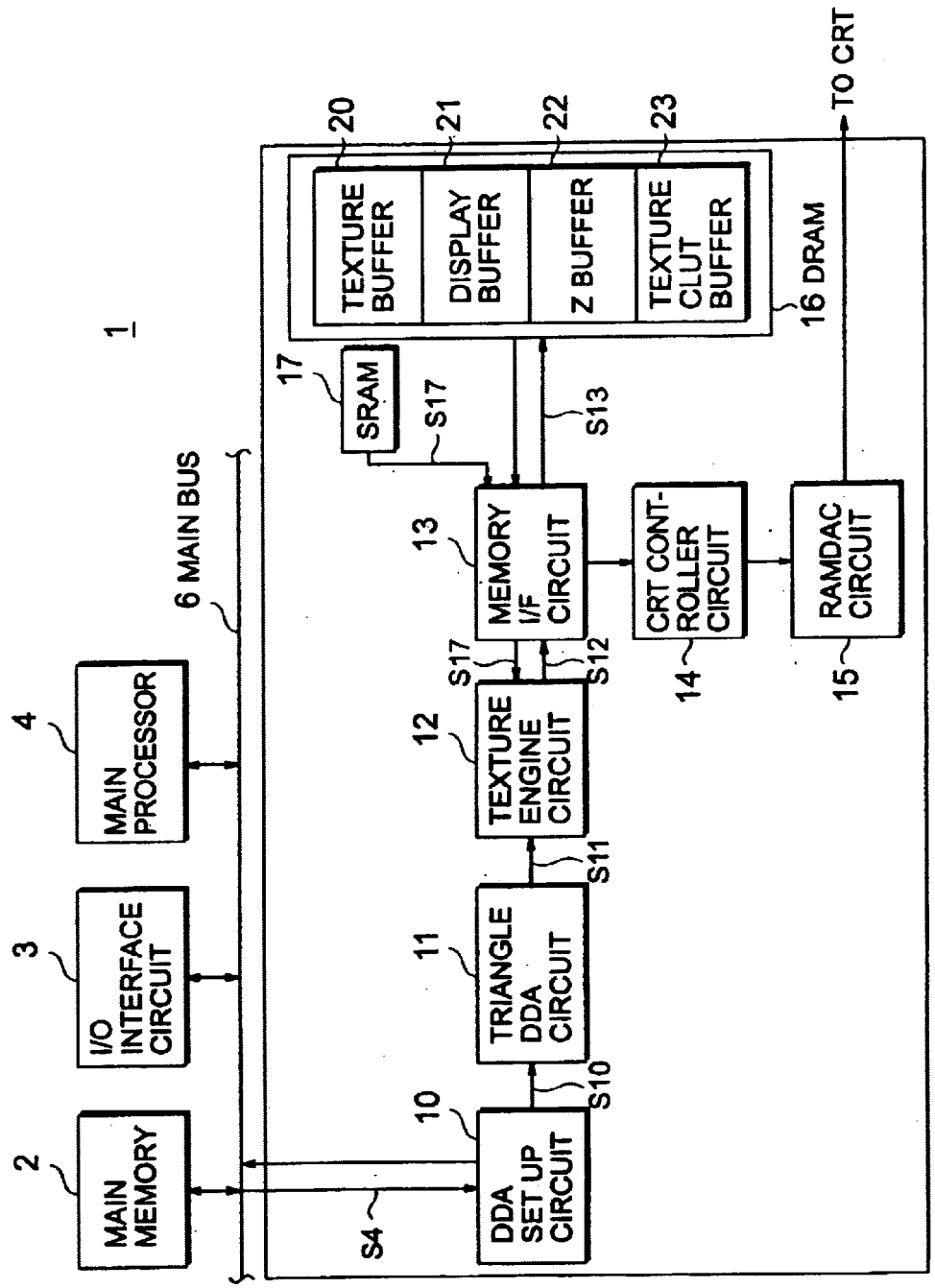
FIG. 1 is a view of a system configuration of a three-dimensional computer graphic system according to a first embodiment of the present invention.

FIG. 1 is a view of the configuration of a three-dimensional computer graphic system 1 of the present embodiment.

The three-dimensional computer graphic system 1 is a system for polygon rendering for expressing a 3D model as a composite of unit graphics of triangles (polygons) and drawing these polygons so as to determine the color of each pixel of a display image and displaying the same on a display.

Further, the three-dimensional computer graphic system 1 expresses a three-dimensional object by using a z-coordinate expressing the depth in addition to the (x, y) coordinates expressing the position on a plane and specifies any point in three-dimensional space by these three coordinates (x, y, z).

As shown in FIG. 1, the three-dimensional computer graphic system 1 is comprised of a main memory 2, an I/O interface 3, a main processor 4, and a rendering circuit 5 connected via a main bus 6.

Below, an explanation will be made of the functions of the components.

The main processor 4 reads out required graphic data from the main memory 2 according to for example the progress of the game and performs clipping, a lighting, geometry processing, and the like on this graphic data to generate the polygon rendering data. The main processor 4 outputs the polygon rendering data S4 to the rendering circuit 5 via the main bus 6.

The I/O interface circuit 3 receives as its input polygon rendering data from the outside according to need and outputs this via the main bus 6 to the rendering circuit 5.

Here, the polygon rendering data includes data of each of the three vertexes (x, y, z, R, G, B, α, s, t, q, F) of the polygons.

Here, the (x, y, z) data indicates the three-dimensional coordinates of a vertex of the polygon, and (R, G, B) data indicates the luminance values of red, green, and blue at the three-dimensional coordinates, respectively.

The data α indicates a coefficient of blending the R, G, B data of a pixel to be drawn and that of a pixel already stored in the display buffer 21.

Among the (s, t, q) data, the (s, t) indicates homogeneous coordinates of a corresponding texture and the g indicates the homogeneous term. Here, the texture size USIZE and VSIZE are respectively multiplied with the "s/q" and "t/q" to obtain coordinate data (u, v) of the texture. The texture coordinate data (u, v) is used for accessing the texture data stored in the texture buffer memory 20.

The F data indicates an α value of fogging.

Below, a rendering circuit 5 will be explained in detail.

As shown in FIG. 1, the rendering circuit 5 comprises a DDA (digital differential analyzer) set up circuit 10, a triangle DDA circuit 11, a texture engine circuit 12 (image processing circuit), a memory I/F circuit 13 (write circuit), a CRT controller circuit 14, a RAMDAC circuit 15, a DRAM 16, and an SRAM 1.

Here, the texture engine circuit 12 corresponds to the image processor of claim 10 of the present invention.

The DRAM 16 functions as a texture buffer 20, a display buffer 12, a z-buffer 22, and a texture CLUT buffer 23.

DDA Set Up Circuit 10

The DDA set-up circuit 10 performs linear interpolation on the values of the vertexes of a triangle in the physical coordinates in a triangle DDA circuit 11 in its latter part. The DDA set-up circuit 10, prior to obtaining information of the color and depth of the respective pixels inside the triangle, performs a set-up operation for obtaining the difference from the sides of the triangle in a horizontal direction for the data (z, R, G, B, α, s, t, q, F) indicated by the polygon rendering data S4a.

Specifically, this set-up operation uses values of the starting point and the ending point and the distance between the two points to calculate the variation of the value to find movement for a unit length.

That is, the DDA set up circuit 10 generates the variations dsdx, dtdx, and dqdx in the x-direction of the (s, t, q) data and variations dsdy, dtdy, and dqdy in the y-direction for each pixel.

The DDA setup circuit 10 outputs the calculated variation data S10 to the triangle DDA circuit 11.

Triangle DDA Circuit 11

The triangle DDA circuit 11 uses the variation data input from the DDA set-up circuit 10 to calculate the (z, R, G, B, α, s, t, q, F) data after linear interpolation of each pixel inside the triangle.

Further, the triangle DDA circuit 11 generates valid bit data $I_1$ to $I_8$ each consisting of one bit indicating whether the 8 pixels being processed in parallel are located inside the triangle being processed.

The valid bit data $I_1$ to $I_8$ indicate for example "1" for the pixels located inside the triangle and "0" for the pixels located outside the triangle.

Figure 2:
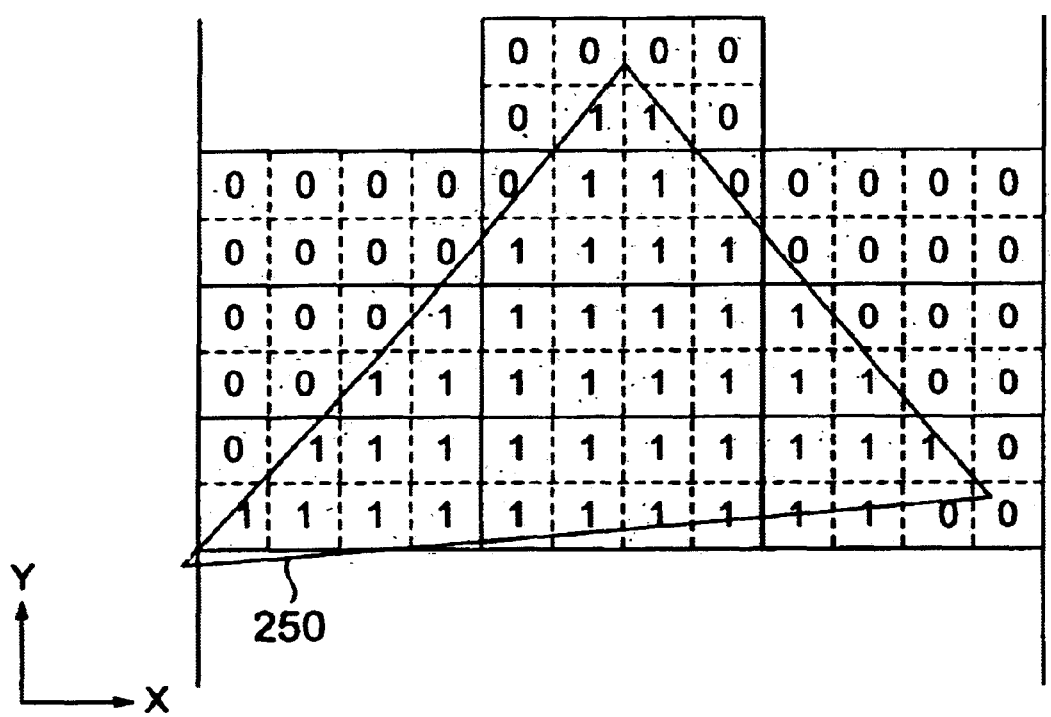
FIG. 2 is a view for explaining a method for generating valid bit data in a DDA set up circuit shown in FIG. 1.

Specifically, as shown in FIG. 2, the valid bit data $I_1$ to $I_8$ are determined for a triangle 250 located in the x, y coordinate system.

Note that, in FIG. 2, the solid lines indicates rectangular areas in which the 8 (=2×4) pixels to be simultaneously processed belong.

The triangle DDA circuit 11 outputs the (x, y) data of the pixels, the (z, R, G, B, α, s, t, q, F) data at the related (x, y) coordinates, the valid bit data $I_1$ to $I_8$, and the data maxe indicating the maximum exponent of the s, t, q data of the vertexes of the triangle to be processed as the DDA data S11 to the texture engine circuit 12.

In the present embodiment, the triangle DDA circuit 11 outputs the DDA data S11 in units of 8 (=2×4) pixels positioned inside a block being processed in parallel to the texture engine circuit 12.

Texture Engine Circuit 12

The texture engine circuit 12 successively performs processing for selection of the reduction rate of the texture addresses data, calculation of "s/q" and "t/q", calculation of the texture coordinate data (u, v), calculation of the texture (U, V), reading of the (R, G, B, tα) data from the texture buffer 20, MIPMAP processing, and blending (texture α-blending) by for example a pipeline method.

At this time, there also exists a case where the selection of the reduction rate of the texture data and the calculation of "s/q" and "t/q" are processed in parallel.

Note that the texture engine circuit 12 simultaneously performs the processing for 8 pixels located inside a predetermined rectangular area in parallel.

Further, the texture engine circuit 12 uses the texture data of the same pattern of the pixels located in the triangle to be processed. Note that the reduction rate of the texture data to be selected is determined in units of 8 pixels located in the rectangular area to be simultaneously processed.

Figure 3:
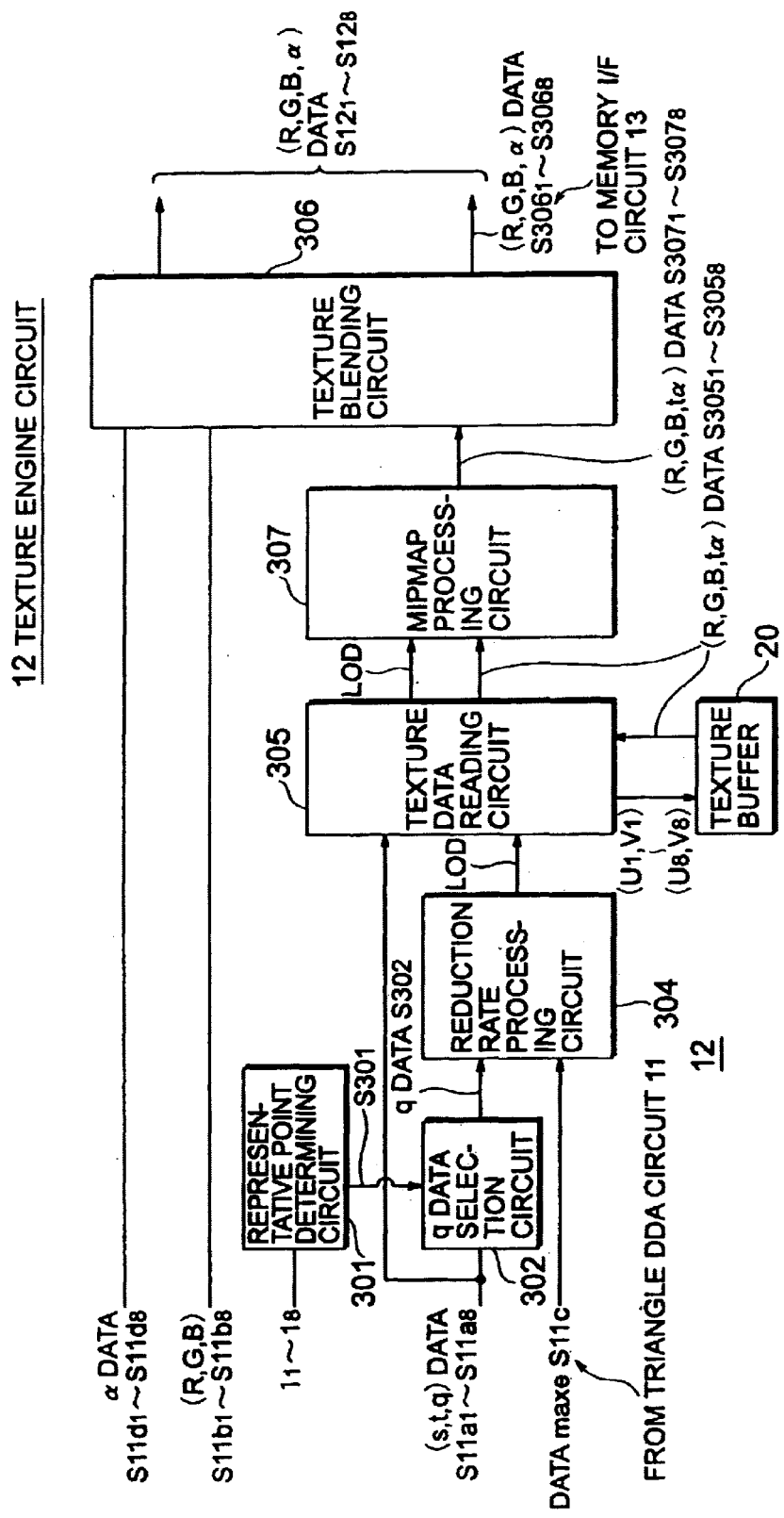
FIG. 3 is a view of the configuration of a texture engine circuit shown in FIG. 1.

FIG. 3 is a view of the configuration of the texture engine circuit 12.

As shown in FIG. 3, the texture engine circuit 12 has a representative point determining circuit 301, a g data selection circuit 302, a reduction rate processing circuit 304, a texture data reading circuit 305, a texture blending circuit 306, and a MIPMAP processing circuit 307.

Here, as mentioned before, the texture engine circuit 12 corresponds to the image processor according to claim 10, the texture buffer 20 corresponds to the storing means, the representative point determining circuit 301 corresponds to the representative point determining circuit, the reduction rate calculation circuit 304 corresponds to the reduction rate calculation circuit, and the texture data reading circuit 305 corresponds to the reading circuit.

[Representative Point Determining Circuit 301]

The representative point determining circuit 301 determines the pixel serving as the representative point from the valid bit data $I_1$ to $I_8$ contained in the DDA data S11 input from the triangle DDA circuit 11 and outputs representative point indication data S301 indicating the related determined representative point to the g data selection circuit 302.

Specifically, the representative point determining circuit 301 determines the pixel nearest the center of the rectangular area in which the related 8 pixels are located or the pixel having the highest priority order among pixels located inside the triangle to be processed among the 8 pixels of the 2 rows×4 columns to be simultaneously processed as the representative point.

[g Data Selection Circuit 302]

The g data selection circuit 302 receives as its input the eight pixels' worth of (s, t, q) data S11a1 to S11a8 contained in the DDA data S11, selects the g data corresponding to the pixel indicated by the representative point indication data S301 among them, and outputs this as g data S302 to the reduction rate processing circuit 304.

The reduction rate processing circuit 304 calculates the reduction rate LOD of the texture data based on the data maxe S11c from the triangle DDA circuit 11 and the g data 302 from the g selection circuit 302.

Here, the data maxe S11c indicates for example the maximum exponent among the exponents of the s, t, q data of the vertexes of the triangle to be processed as shown in FIG. 2.

In this way, the reduction rate processing circuit 304 uses the g data of the pixel determined as the representative point in the representative point determining circuit 301 and the data maxe S11c to calculate the reduction rate and outputs this to the texture data reading circuit 305 as the reduction rate LOD.

Here, the reduction rate LOD indicates to what degree the texture data of the original image was reduced and becomes ½, ¼, ⅛, . . . the reduction rate of the original image is ¹⁄i.

The processing for calculating the reduction rate LOD in the reduction rate processing circuit 304 is indicated by the following equation (6).

$$\text{LOD} = \text{Clamp}(((\log_2 1/q) - \text{maxe}) \ll L + K) \tag{6}$$

where, LOD is a data, indicating the reduction rate, comprised by 3 bits of the integer part, 4 parts of the decimal part, and no sign (unsigned), maxe is a data, indicating the maximum exponent of s, t, q of the vertexes of the triangle shown in FIG. 2, comprised by 8 bits of the integer part and no sign (unsigned), g is a data comprised by 10 bits of the integer part, 5 bits of the decimal part, and a sign (signed), L is a data comprised of 2 bits and no sign where the maximum value of L is the decimal number "3" and K is a data comprised by 8 bits of the integer part, 4 bits of the decimal part, and a sign.

Figure 4:
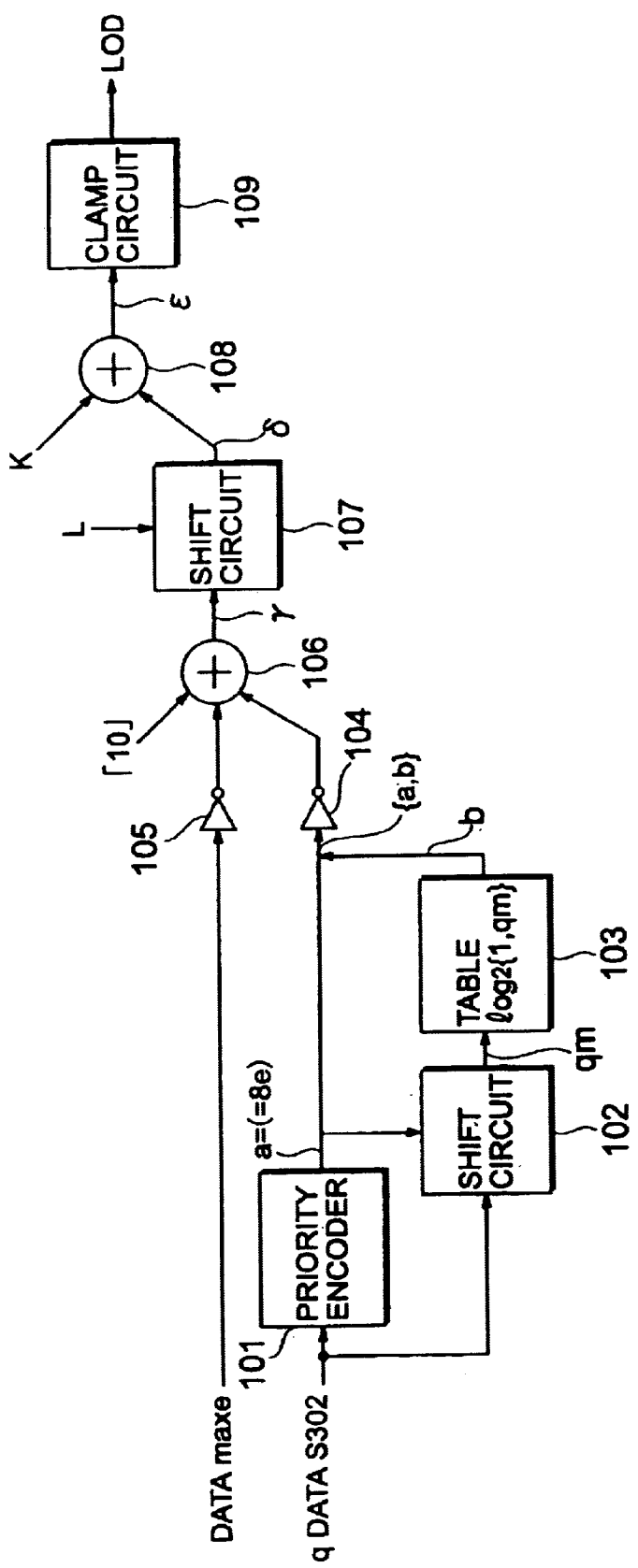
FIG. 4 is a view of the configuration of a reduction rate processing circuit shown in FIG. 3.

FIG. 4 is a view of the configuration of the reduction rate processing circuit 304.

As shown in FIG. 4, the reduction rate processing circuit 304 has a priority encoder 101, a shift circuit 102, a table 103, indenters 104 and 105, and adder circuit 106, a shift circuit 107, an adder circuit 108, and a clamp circuit 109.

Here, the data L and the data K are stored in a register built in the reduction rate processing circuit 304.

In terms of the correspondence with the components of claim 10, the priority encoder 101 and the shift circuit 102 correspond to the normalization circuit, the table 103 corresponds to the data outputting means, the inverter 104 corresponds to the first inversion circuit, the inverter 105 corresponds to the second inversion circuit, the adder circuit 106 corresponds to the first adder circuit, the shift circuit 107 corresponds to the shift circuit, the adder circuit 108 corresponds to the second adder circuit, and the clamp circuit 109 corresponds to the clamp circuit.

The priority encoder 101 finds a logarithm of 2 value "$\log_2 q$" of the data g input from the g selection circuit 302 and outputs an integer value "int($\log_2 q$)" of the logarithm of 2 value "$\log_2 q$", that is, the exponent ge, as data a to the shift circuit 102 and the inverter 104.

The shift circuit 102 shifts the data g input from the g selection circuit 302 toward the LSB by exactly the exponent ge input from the priority encoder 101 and outputs the decimal part of the results to the table 103 as the data gm.

The table 103 is provided with a correspondence table between the input data and the logarithm of 2 values of the related input data plus 1, acquires the logarithm of 2 value "$\log_2(\{1, qm\})$" corresponding to the related data gm for the correspondence table using the data gm input from the shift circuit 102 as a key, and outputs this as data b.

Note that use may also be made of a program of automatically generating "$\log_2(\{1, qm\})$" when the data gm is input in place of the table 103.

The data a and the data b are bit coupled using the data a as the integer part and the data b as the decimal part, and the data $\{a, b\}$ after the related bit coupling is output to the inverter 104.

Here, it is seen from the following equation (7) that the data $\{a, b\}$ indicates the value obtained by inverting the sign of "$\log_2(1/q)$" in equation (6).

$$\log_2(1/q)$$
$$= -\log_2 q$$
$$= -\log_2(\{1, qm\} \times 2qe)$$
$$= -\log_2(\{1, qm\}) - qe$$
$$= -\log_2(\{1, qm\}) + qe$$
$$= -(\log_2(\{1, qm\}) + qe)$$
$$= -\{a, b\} \tag{7}$$

The inverter 104 inverts the data $\{a, b\}$ and outputs data $^-\{a, b\}$ as the result of this to the adder circuit 106.

The inverter 105 inverts the data maxe input from the triangle DDA circuit 11 and outputs the data $^-$maxe as the result of this to the adder circuit 106.

The adder circuit 106 adds 2=(0.0000010), the data $^-$maxe, and the data $^-\{a, b\}$ and outputs γ as the result of this to the shift circuit 107.

Here, the operation equation "$^{-}\{a, b\} + ^-\text{maxe} + 2$" can be modified as in the following equation (8). Namely, the data γ indicates the result of the operation in the innermost parentheses in equation (6).

$$\gamma = ^-\{a, b\} + ^-\text{max}e + 2$$
$$= -\{a, b\} - \text{max}e$$
$$= \log_2(1/q) - \text{max}e$$

The shift circuit 107 shifts the data γ input from the adder circuit 106 toward the MSB by exactly the number of bits indicated by the data L and outputs the result of this as data δ to the shift circuit 107.

Namely, the following equation (9) stands:

$$\delta = \gamma \ll L \tag{9}$$

The adder circuit 108 adds the data δ from the shift circuit 107 and the data K and outputs the result of this as a data ε to the clamp circuit 109.

Namely, the following equation (10) stands.

$$\epsilon = \delta + \kappa \tag{10}$$

Figure 5:
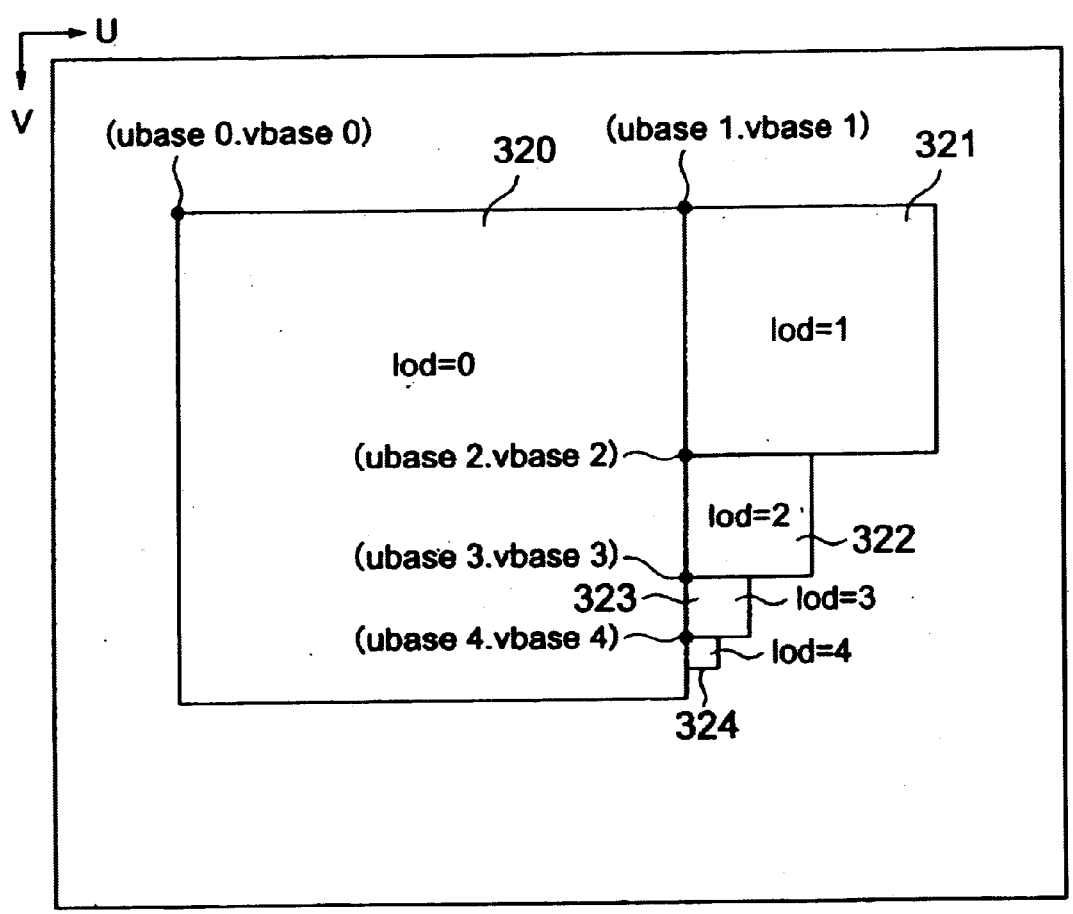
FIG. 5 is a view for explaining an address space of a texture buffer shown in FIG. 1 and FIG. 3.

The clamp circuit 109 clamps the data ε input from the adder circuit 108 to the data comprised by 3 bits of an integer and 4 bits of a decimal part (rounding) and outputs the result of this as the reduction rate LOD to the texture data reading circuit 305 shown in FIG. 3, Note that the texture buffer 20, for example, as shown in FIG. 5, stores the texture data 320, 321, 322, and 323 of the reduction rates LOD=0, 1, 2, 3, 4.

The address space of the texture buffer 20 is expressed by the U, V coordinate system as shown in FIG. 5, and reference addresses (start addresses) of a storage area in which the texture data corresponding to a plurality of reduction rates are stored are calculated based on the reduction rate LOD obtained at the reduction rate processing circuit 304 shown in FIG. 4. In the example shown in FIG. 5, the reference addresses of the texture data 320, 321, 322, and 323 become (ubase$_0$, vbase$_0$), (ubase$_1$, vbase$_1$), (ubase$_2$, vbase$_2$), and (ubase$_3$, vbase$_3$).

Further, the texture address (U, V) for each pixel in the texture data stored in the texture buffer 20 is generated from for example U=ubase+u/$2^{LOD"}$ and "V=vbase+v/$2^{LOD"}$ by using the reference address (ubase, vbase) and the texture coordinate data (u, v).

Figure 6:
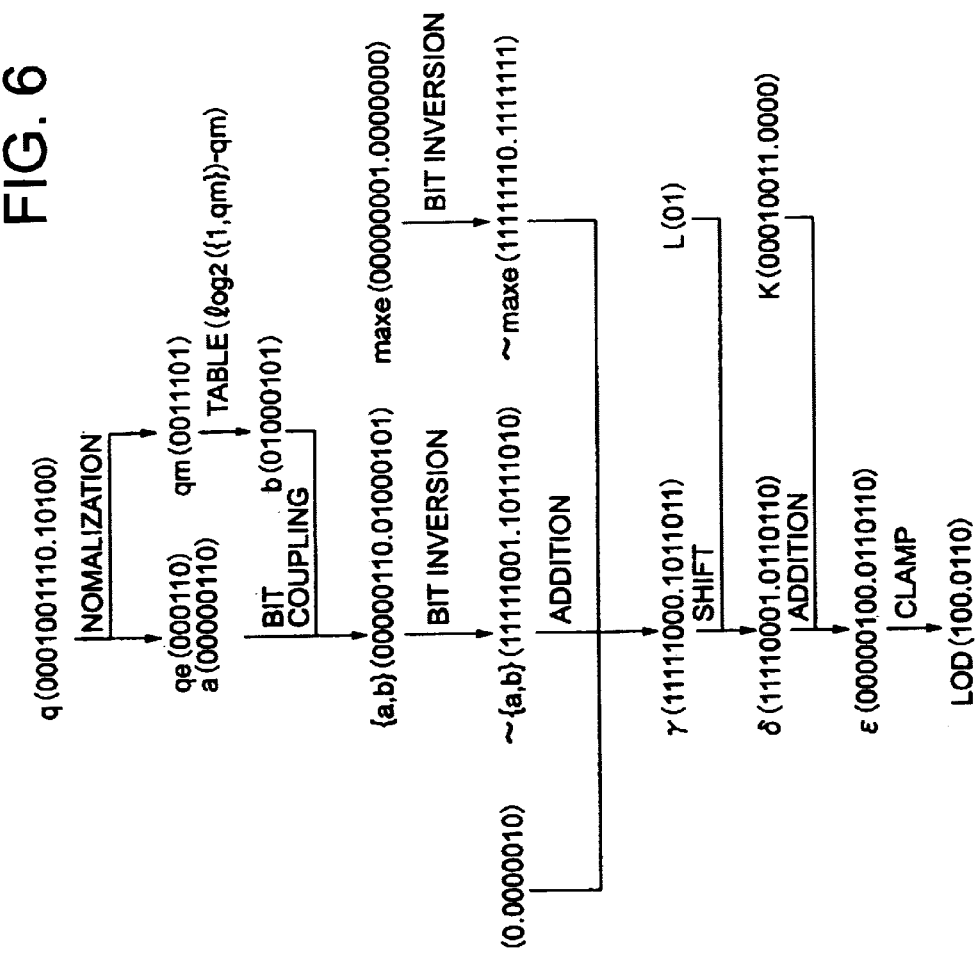
FIG. 6 is a view for explaining a concrete example of a reduction rate processing circuit shown in FIG. 4.

FIG. 6 is a view for explaining the processing in the reduction rate processing circuit 304 shown in FIG. 4.

Below, the explanation will be made of the operation of the reduction rate processing circuit 304 shown in FIG. 4 by using a concrete example.

Here, a case where the processing of equation (6) is carried out in the reduction rate processing circuit 304 by using the following values is exemplified:

$q$=(0001001110. 10100):

In q (0001001110.10100), (0001001110) is the integer part, and (10100) is the decimal part.

maxe=(0000000.1.0000000):

In maxe (00000001.0000000), (00000001) is the integer part, and (0000000) is the decimal part.

$L$=(01):

$K$=(00010011.0000):

Here, (00010011) is the integer part, and (0000) is the decimal part.

In this case, the reduction rate processing circuit 304 shown in FIG. 4, first, receives as input the q (0001001110.10100) of the g data S302 output from the g selection output 302 at the priority encoder 101 and the shift circuit 102 shown in FIG. 4.

Next, the priority encoder 101 finds the exponent qe (000110) of q (0001001110.10100), adds (00) to the MSB side of the related exponent qe(000110), and outputs (00000110) of the 8 bits of data obtained.

Next, the shift circuit 102 shifts the q (0001001110.10100) toward the LSB side by exactly (00000110) and outputs the decimal part after the shift as the mantissa qm (0011101) to the table 103.

Next, the table 103 obtains the b (01000101) of the 8 bits of the data ("$\log_2$ ({1, qm})") corresponding to the mantissa qm (0011101) and obtains and outputs b (01000101).

Next, the circuit bit couples a (00000110) output from the priority encoder 101 and b (01000101) {a, b} and outputs the {a, b} (00000110.01000101) as the result of this to the inverter 104.

Next, the inverter 104 finds the inverted value of {a, b} (00000110.01000101) and outputs $^-$ {a, b} (11111001.10111010) as the result of this to the adder circuit 106.

Further, the inverter 105 finds the inverted value of maxe (00000001.0000000) of the data maxe S11c input from the triangle DDA circuit 11 shown in FIG. 1 and outputs $^-$maxe(11111110.1111111) as the result of this to the adder circuit 106.

Next, the adder circuit 106 adds (0.0000010) indicating the decimal number "2" by a binary base, $^-$ {a, b} (11111001.10111010), and $^-$maxe (11111110.1111111) and outputs data γ (11111000.1011011) as the result of the addition to the shift circuit 107.

Next, the shift circuit 107 shifts the data γ (11111000.1011011) toward the MSB by exactly the value indicated by the data L(01) and outputs δ (11110001.0110110) as the result of this to the adder circuit 108.

Next, the adder circuit 108 adds the data δ(11110001.0110110) and data K (00010011.0000) and outputs ε (00000100.0110110) as the result of this to the clamp circuit 109.

Next, the clamp circuit 109 clamps the ε (00000100.0110110) to the data comprised of 3 bits of an integer part and 4 bits of a decimal part and outputs LOD (100.0110) as the result of this to the texture data reading circuit 305 shown in FIG. 3.

[Texture Data Reading Circuit 305]

The texture data reading circuit 305 uses the eight pixels' worth of (s, t, q) data S11$a_1$ to S11$a_8$ contained in the DDA data S11, the reduction rate LOD from the reduction rate processing circuit 304, and the texture sizes USIZE and VSIZE to read the texture data S305 corresponding to the 8 pixels in the rectangular area located in the triangle being processed and to be simultaneously processed from the texture buffer 20 and outputs the same to the MIPMAP processing circuit 307.

At this time, the texture data reading circuit 305 reads one texture data corresponding to the related reduction rate LOD from among the texture data 320 to 324 shown in FIG. 5 when the related reduction rate LOD is an integer and outputs the same to the MIPMAP processing circuit 307.

Further, the texture data reading circuit 305 reads two texture data corresponding to the reduction rates of integers before and after the related reduction rate LOD from among the texture data 320 to 324 shown in FIG. 5 when the reduction rate LOD has a decimal value and outputs the same to the MIPMAP processing circuit 307.

Figure 7:
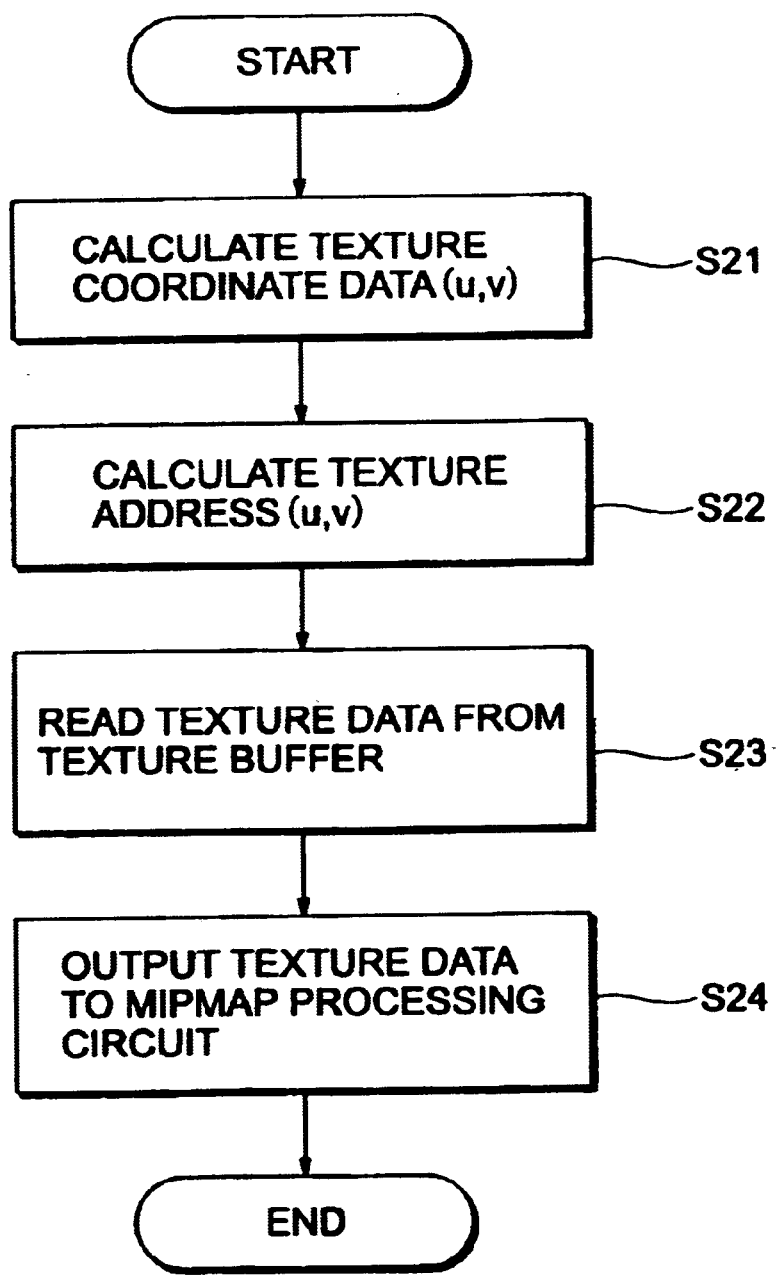
FIG. 7 is a flowchart of processing in a texture data reading circuit shown in FIG. 3.

FIG. 7 is a flowchart of the processing for reading one texture data corresponding to the reduction rate LOD in the texture data reading circuit 305.

Step S21: The texture data reading circuit 305 performs an operation of dividing the s data by the q data and an operation of dividing the t data by the q data for each of eight pixels' worth of the (s, t, q) data S11$a_1$ to S11$a_8$ to calculate the division results "s/q" and "t/q".

Then, it multiplies the division results "s/q" and "t/q" by the texture sizes USIZE and VSIZE to calculate the texture coordinate data (u$_1$, v$_1$) to (u$_8$, v$_8$) corresponding to the pixels.

Step S22: The texture data reading circuit 305 acquires the reference address (ubase, vbase) corresponding to the reduction rate LOD generated in the reduction rate processing circuit 304 by referring to for example an address table prepared in advance.

Then, the texture data reading circuit 305 uses the reference address (ubase, vbase) and the texture coordinate data (u$_1$, v$_1$) to (u$_8$, v$_8$) calculated at step S21 to generate texture addresses (U$_1$, V$_1$) to (U$_8$, V$_8$) of physical addresses in the UV coordinate system of the texture buffer 20 from for example U=ubase+u/$2^{LOD"}$ and V=vbase+v/$2^{LOD"}$.

Step S23: The texture data reading circuit 305 outputs the texture addresses (U$_1$, V$_1$) to (U$_8$, V$_8$) generated at step S22 via the memory I/F circuit 13 shown in FIG. 1 to the texture buffer 20 and reads the texture data of (R, G, B, tα) data $S305_1$ to $S305_8$.

Note that the SRAM 17 stores a copy of the texture data stored in the texture buffer 20, and the texture engine circuit 12 actually reads the texture data stored in the SRAM 17 via the memory I/F circuit 13.

Step S24: The texture data reading circuit 305 outputs the (R, G, B, tα) data $S305_1$ to $S305_8$ read out at step S23 to the MIPMAP processing circuit 307.

[MIPMAP Processing Circuit 307]

When the reduction rate LOD has a decimal value, the MIPMAP processing circuit 307 receives as its input the (R, G, B, tα) data $S305_1$ to $S305_8$ of the two texture data corresponding to the reduction rate of the integer values before and after it and the reduction rate LOD from the texture data reading circuit 305. Then, the MIPMAP processing circuit 307 performs linear level interpolation on the input two texture data (R, G, B, tα) data $S305_1$ to $S305_8$ using the decimal part of the reduction rate LOD to generate the (R, G, B, tα) data $S307_1$ to $S307_8$ corresponding to the reduction rate LOD and outputs this to the texture blending circuit 306.

When the reduction rate LOD is an integer, the MIPMAP processing circuit 307 outputs the (R, G, B, tα) data $S305_1$ to $S305_8$ input from the texture data reading circuit 305 as they are to the texture blending circuit 306 as the (R, G, B, tα) data $S307_1$ to $S307_8$.

[Texture Blending Circuit 306]

The texture blending circuit 306 multiplies corresponding elements of the eight pixels' worth of (R, G, B, α) data $S11b_1$ to $S11b_8$ contained in the DDA data S11 and the (R, G, B, tα) data $S307_1$ to $S307_8$ input from the MIPMAP processing circuit 307 to thereby generate the (R, G, B, α) data $S306_1$ to $S306_8$.

Then, it outputs the (R, G, B, α) data $S306_1$ to $S306_8$ as (R, G, B, α) data $S12_1$ to $S12_8$ to the memory I/F circuit 13.

Note that the texture engine circuit 12 directly uses the (R, G, B, tα) data read out from the texture buffer 20 in the case of a full color method. On the other hand, in the case of an index color method, the texture engine circuit 12 reads a color look up table (CLUT) prepared in advance from the texture CLUT buffer 23, transfers and stores this in the built-in SRAM, and acquires the (R, G, B) data corresponding to the color index read out from the texture buffer 20 by using this color look up table.

Memory I/F Circuit 13

Further, the memory I/F circuit 13 compares the (R, G, B, α) data $S12_1$ to $S12_8$ input from the texture engine circuit 12, that is, the z data corresponding to the pixel data S12 and the z data stored in the z buffer 22, decides whether or not the image drawn by the input pixel data S12 is located in front of (on the perspective side) of the image written in the display buffer 21 at a previous time, and, when it is located in front, updates the z data stored in the z buffer 22 by the z data corresponding to the pixel data S12.

Further, the memory I/F circuit 13 performs so-called α-blending of blending the (R, G, B) data contained in the pixel data S12 and the (R, G, B) data which has been already stored in the display buffer 21 by the blending value indicated by the α corresponding to the pixel data S12 according to need and writes (enters) the (R, G, B) data after the blending into the display buffer 21.

Note that the DRAM 16 is simultaneously accessed by the memory I/F circuit 13 for 16 pixels. Note that the DRAM 16 may be simultaneously accessed by the memory I/F circuit 13 for 8 pixels or 32 pixels.

CRT Controller Circuit 14

The CRT controller circuit 14 generates addresses to be displayed on the not illustrated CRT in synchronization with given horizontal and vertical synchronization signals and outputs a request of reading the displayed data from the display buffer 21 to the memory I/F circuit 13. In response to this request, the memory I/F circuit 13 reads a certain amount of the displayed data from the display buffer 21. The CRT controller circuit 14 has a built-in first-in first-out (FIFO) circuit for storing the displayed data read out from the display buffer 21 and outputs the index value of the RGB to the RAMDAC circuit 15 at a predetermined time interval.

RAMDAC Circuit 15

The RAMDAC circuit 15 stores the R, G, B data corresponding to index values, transfers the R, G, B data of a digital format corresponding to the index values of RGB input from the CRT controller circuit 14 to a D/A converter, and generates R, G, B data of an analog format. The RAMDAC circuit 15 outputs these generated R, G, B data to the CRT.

Below, an explanation will be made of the operation of the three-dimensional computer graphic system 1.

The polygon rendering data S4 is output from the main processor 4 to the DDA set up circuit 10 via the main bus 6. The DDA set up circuit 10 generates the variation data S10 indicating the difference from the sides of the triangle in the horizontal direction.

Namely, it generates dsdx, dtdx, and dqdx as variations of (s, t, q) in the x direction dsdy, dtdy, and dqdy as the variations in the y direction.

Then, the variation data S10 is output from the DDA set up circuit 10 to the triangle DDA circuit 11.

Next, the triangle DDA circuit 11 generates the linearly interpolated (z, R, G, B, α, s, t, q, F) at the pixels inside the triangle based on the variation data S10.

Further, the triangle DDA circuit 11 generates 1-bit valid bit data for the 8 pixels to be processed in parallel indicating whether or not they are located inside the triangle to be processed.

Then, the triangle DDA circuit 11 outputs to the texture engine circuit 12 the (x, y) data of the pixels, the (z, R, G, B, α, s, t, q, F) data at the related (x, y) coordinates, the valid bit data $I_1$ to $I_8$, and the data maxe indicating the maximum exponent of the s, t, q data of the vertexes of the triangle being processed as the DDA data S11.

Next, the representative point determining circuit 301 of the texture engine circuit 12 shown in FIG. 3 determines the representative point and outputs the representative point indication data S301 indicating the determined representative point to the q data selection circuit 302.

Then, the q data selection circuit 302 selects the q data corresponding to the pixel indicated by the representative point indication data S301 from among the eight pixels' worth of the (s, t, q) data $S11a_1$ to $S11a_8$ contained in the input DDA data S11 and outputs this as the q data S302 to the reduction rate processing circuit 304.

Next, the reduction rate processing circuit 304 shown in FIG. 4 uses the q data S302 and data maxe S11c to calculate the reduction rate LOD of the texture data by the routine shown in FIG. 6 and outputs the related reduction rate LOD to the texture data reading circuit 305.

Next, the texture data reading circuit 305, the texture data S305 corresponding to 8 pixels in the rectangular area located in the triangle as the processing object and then to be simultaneously processed is read out from the texture buffer 20 by using eight pixels' worth of the (s, t, q) data S11a1 to S11a8 contained in the input DDA data S11, the reduction rate LOD from the reduction rate processing circuit 304 and the texture sizes USIZE and VSIZE, and output to the MIPMAP processing circuit 307.

At this time, when the reduction rate LOD is an integer, the texture data reading circuit 305 reads one texture data corresponding to the related reduction rate LOD among the texture data 320 to 324 shown in FIG. 5 and outputs it to the MIPMAP processing circuit 307.

When the reduction rate LOD has a decimal value, the texture data reading circuit 305 reads out two texture data corresponding to the reduction rates of the integers before and after the related reduction rate LOD from among the texture data 320 to 324 shown in FIG. 5 and output them to the MIPMAP processing circuit 307.

Next, when the reduction rate LOD has a decimal value, the MIPMAP processing circuit 307 performs linear level interpolation using the (R, G, B, tα) data $S305_1$ to $S305_8$ of the two texture data input from the texture data reading circuit 305 corresponding to the reduction rates of the integer values before and after that to generate the (R, G, B, tα) data $S307_1$ to $S307_8$ corresponding to the reduction rate LOD and outputs them to the texture blending circuit 306.

Further, when the reduction rate LOD is an integer, the MIPMAP processing circuit 307 outputs the (R, G, B, tα) data $S305_1$ to $S305_8$ input from the texture data reading circuit 305 as they are to the texture blending circuit 306 as the (R, G, B, tα) data $S307_1$ to $S307_8$.

Next, the texture blending circuit 306 multiplies corresponding elements of the eight pixels' worth of the (R, G, B, α) data $S11b_1$ to $S11b_8$ contained in the DDA data S11 and the (R, G, B, tα) data $S307_1$ to $S307_8$ input from the MIPMAP processing circuit 307 to generate the (R, G, B, tα) data $S306_1$ to $S306_8$.

Then, the α data $S11d_1$ to $S11d_8$ contained in the DDA data and the (R, G, B, α) data $S306_1$ to $S306_8$ are output as (R, G, B, α) data $S12_1$ to $S12_8$, that is, the pixel data S12, to the memory I/F circuit 13.

Then, the memory I/F circuit 13 compares the z data corresponding to the pixel data S12 input from the texture engine circuit 12 and the z data stored in the z buffer 22 and decides whether or not the image drawn by the input pixel data S12 is located in front of (on the perspective side) the image written in the display buffer 21 at the previous time and, when it is located in front, updates the z data stored in the z buffer 22 by the z data corresponding to the image data S12.

Next, the memory I/F circuit 13, according to need, blends the (R, G, B) data contained in the image data S12 and the (R, G, B) data which has been already stored in the display buffer 21 by the blending value indicated by the α data corresponding to the pixel data S12 and writes the (R, G, B) data after the blending into the display buffer 21.

As explained above, according to the three-dimensional computer graphic system 1, when reading the texture data from the texture buffer 20 in the texture engine circuit 12 shown in FIG. 1, the reduction rate processing circuit 304 shown in FIG. 3 and FIG. 4 calculates the reduction rate LOD by using the q data of one pixel among the 8 pixels to be simultaneously processed. Then, the texture data reading circuit 305 reads out the texture data for the 8 pixels to be simultaneously processed by using the same reduction rate LOD.

Second Embodiment

In the present embodiment, for example, a case where a precision of $2^{-4}$ or more (i.e., where at least the upper significant four bits in the decimal part are correct) is required in the linear level interpolation performed by the MIPMAP processing circuit 307 shown in FIG. 3 is illustrated.

In this case, it is necessary to make the error of the "$\log_2(1/q)$" shown in equation (6), which becomes a factor of the error of the reduction rate LOD, to $2^{-7}$ so as to reduce the error of the reduction rate LOD to about $2^{-4}$ even in the case where the data $\underline{L}$ is the maximum value "3".

In the present embodiment, the explanation will be made of a three-dimensional computer graphic system using a reduction rate processing circuit capable of improving the precision of the reduction rate LOD in comparison with the reduction rate processing circuit 304 shown in FIG. 3 and FIG. 4 explained above and in addition capable of performing operation at a high speed with a small number of gates (small scale circuit).

The three-dimensional computer graphic system of the present embodiment is the same as the three-dimensional computer graphic system of the first embodiment except for the configuration of the texture engine circuit 12 shown in FIG. 1.

Figure 8:
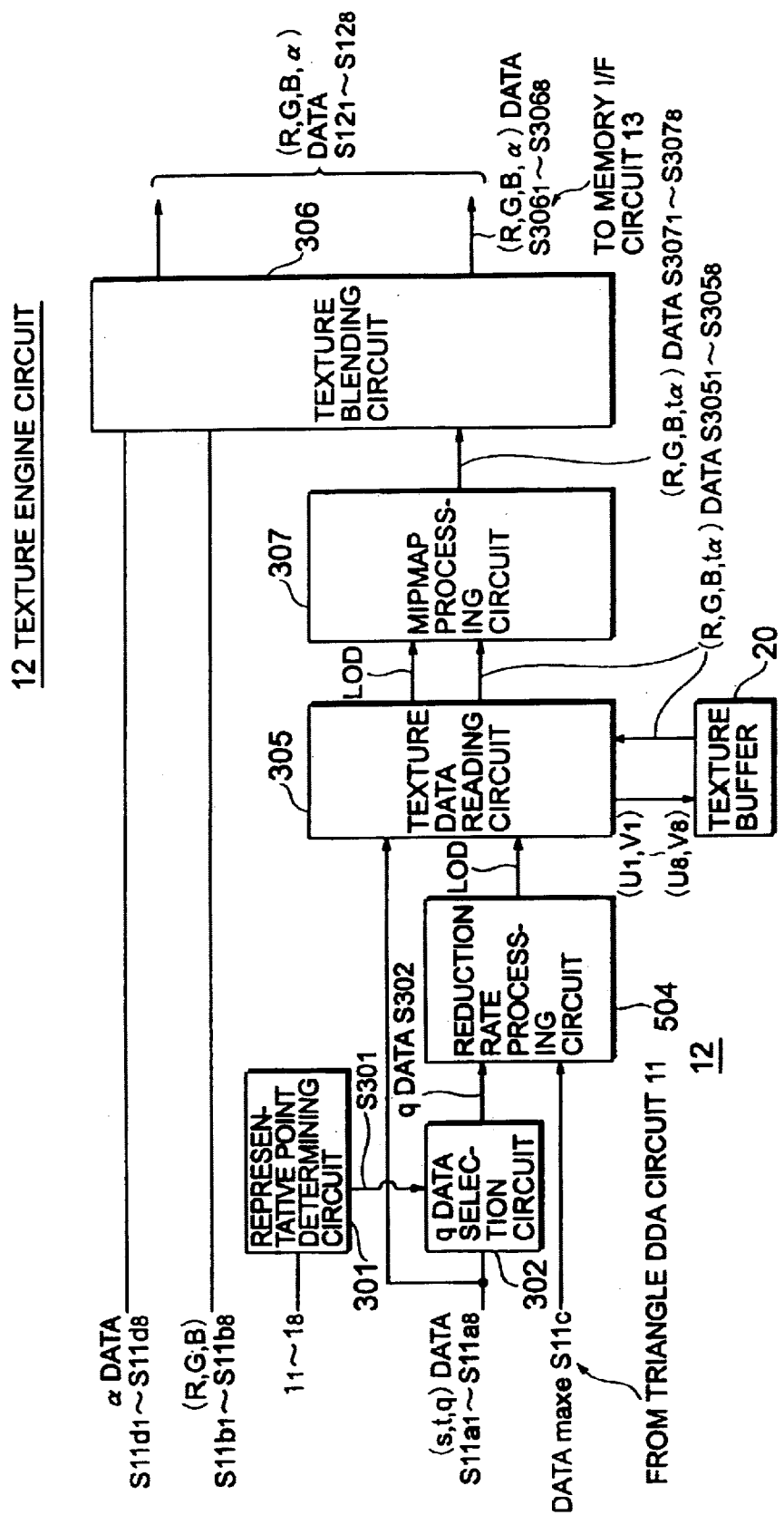
FIG. 8 is a view of the configuration of the texture engine circuit of a three-dimensional computer graphic system according to a second embodiment of the present invention.

FIG. 8 is a view of the configuration of the texture engine circuit 12 of the three-dimensional computer graphic system of the present embodiment.

In FIG. 8, components given the same reference numerals as those in FIG. 3 are the same as the components of the same reference numerals explained in the first embodiment.

Namely, the texture engine circuit 12 of the present embodiment has a configuration of the reduction rate processing circuit 504 shown in FIG. 8 different from the reduction rate processing circuit 304 of the first embodiment.

The texture engine circuit 12 of the present embodiment corresponds to the image processor according to claim 7.

Here, in terms of the correspondence between the components of claim 7 and FIG. 8, the texture buffer 20 corresponds to the storing means, the representative point determining circuit 301 corresponds to the representative point determining circuit, the reduction rate processing circuit 504 corresponds to the reduction rate calculation circuit, and the texture data reading circuit 305 corresponds to the reading circuit.

Further, the reduction rate processing circuit 504 corresponds to the processing circuit of claim 4.

Below, a detailed explanation will be made of the reduction rate processing circuit 504.

Figure 9:
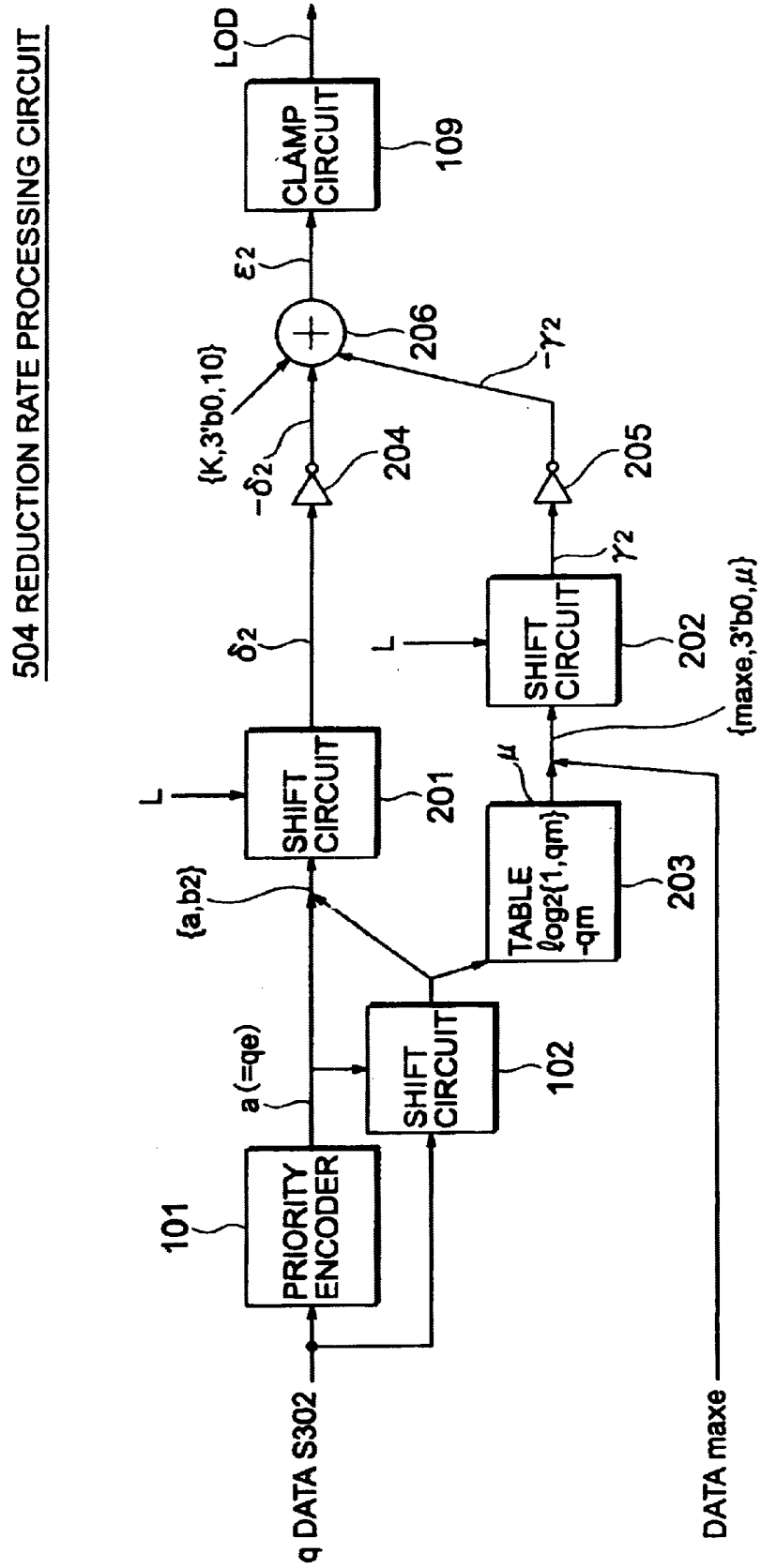
FIG. 9 is a view of the configuration of a reduction rate processing circuit shown in FIG. 8.

FIG. 9 is a view of the configuration of the reduction rate processing circuit 504.

As shown in FIG. 9, the reduction rate processing circuit 504 has the priority encoder 101, shift circuit 102, shift circuits 201 and 202, a table 203, indenters 204 and 205, an adder circuit 206, and the clamp circuit 109.

Here, in terms of the correspondence between the components of claim 4 and claim 7 and FIG. 9, the priority encoder 101 and the shift circuit 102 correspond to the normalization circuit, the shift circuit 201 corresponds to the first shift circuit, the inverter 204 corresponds to the first inversion circuit, the table 203 corresponds to the data outputting means, the shift circuit 202 corresponds to the second shift circuit, the inverter 205 corresponds to the second inversion circuit, the adder circuit 206 corresponds to the adder circuit, and the clamp circuit 109 corresponds to the clamp circuit.

The reduction rate processing circuit 504 performs the operation of equation (6) and outputs the reduction rate LOD as the result of the operation to the MIPMAP processing circuit 307 shown in FIG. 8.

The priority encoder 101 finds the logarithm of 2 value "$\log_2 q$" of the data $\underline{q}$ input from the q selection circuit 302 shown in FIG. 8 and outputs the integer value "$\text{int}(\log_2 q)$"

of the logarithm of 2 value "$\log_2 q$", that is, the exponent qe, as the data a to the shift circuits 102 and 201.

The shift circuit 102 shifts the data q input from the q selection circuit 302 toward the LSB by exactly the exponent qe input from the priority encoder 101 and outputs the data qm of the decimal part of the result as the data b2 to the shift circuit 201 and the table 203.

The data a output by the priority encoder 101 and the data b2 output by the shift circuit 102 are bit coupled, and a data {a, b2} of the result is output to the shift circuit 201.

The shift circuit 201 shifts the input data {a, b2} toward the MSB by exactly the input data L and outputs the data δ2 of the result to the inverter 204.

The inverter 204 inverts the data δ2 and outputs the data ⁻δ2 of the result to the adder circuit 206.

The table 203 is provided with a correspondence table between the data qm and "$\log_2(\{1,qm\})-qm$", acquires "$\log_2(\{1,qm\})-qm$" corresponding to the related data qm from the correspondence table using the data qm (=b2) input from the shift circuit 102 as a key, and outputs this as the data $\mu$ to the shift circuit 202.

Note that it is also possible to use program automatically generating "$\log_2(\{1, qm\})-qm$" by using the input data qm in place of the table 203.

The data maxe input from the triangle DDA circuit 11 and the data $\mu$ output from the table 203 are coupled using the data maxe as the integer part and connecting (000) before the data $\mu$ so that the decimal part becomes 7 bits and using the result as the decimal part. The data {maxe, 3'b0, $\mu$} after the related bit coupling is output to the shift circuit 202. Here, "3' b0" means the 3-bit binary number 0 in the Verilog-HDL notation.

The shift circuit 202 shifts the input data {maxe, 3'b0, $\mu$} toward the MSB by exactly the input data L and outputs the γ2 of the result to the inverter 205.

The inverter 104 inverts the data {a, b} and outputs the data ⁻{a, b} of the result to the adder circuit 106.

The inverter 204 inverts the data γ2 and outputs the data ⁻γ2 of the result to the adder circuit 206.

Further, the data K and "10" are coupled by adding one bit of "0" before "10" so that the decimal part consists of 7 bits. The data {K, 3'b0, 10} after the related bit coupling is output to the adder circuit 206.

The adder circuit 206 adds the data {K, 3'b0, 10}, the data ⁻δ2, and the data ⁻γ2 and outputs ε2 as the result of the addition to the clamp circuit 109.

The clamp circuit 109 clamps (rounds) the data ε2 input from the adder circuit 206 to the data comprised by 3 bits of an integer part and 4 bits of a decimal part and outputs the result of this as the reduction rate LOD to the texture data reading circuit 305 shown in FIG. 8.

The reduction rate processing circuit 504 shown in FIG. 9 uses the table 203 shown in FIG. 9 for outputting $\mu$ (="$\log_2(\{1, qm\})-qm$") corresponding to the input data qm to bit couple the data maxe comprised by only an integer part and the data $\mu$ comprised by only a decimal part so as to reduce the addition concerning the data maxe.

Due to this, according to the reduction rate processing circuit 504, a reduction of the number of gates and an increase of the speed of the processing can be achieved compared with the reduction rate processing circuit 304 shown in FIG. 3 and FIG. 4.

Further, the reduction rate processing circuit 504 can use the fact that the decimal part b of "$\log_2(1/q)$" in the equation (6) and the upper significant 4 bits (=2–4) of the mantissa qm are similar and obtain the lower significant 4 bits of the seven bits of the decimal part of "$\log_2(1/q)$" determining the precision of the lower significant 4 bits in the seven bits of the decimal part of the reduction rate LOD by using the table 203 so as to reduce the error of "$\log_2(1/q)$" shown in the equation (6), which becomes a factor of the error of the reduction rate LOD, to $2^{-7}$ and reduce the error of the reduction rate LOD to about $2^{-4}$ even in the case where the data L is the maximum value "3".

Figure 10:
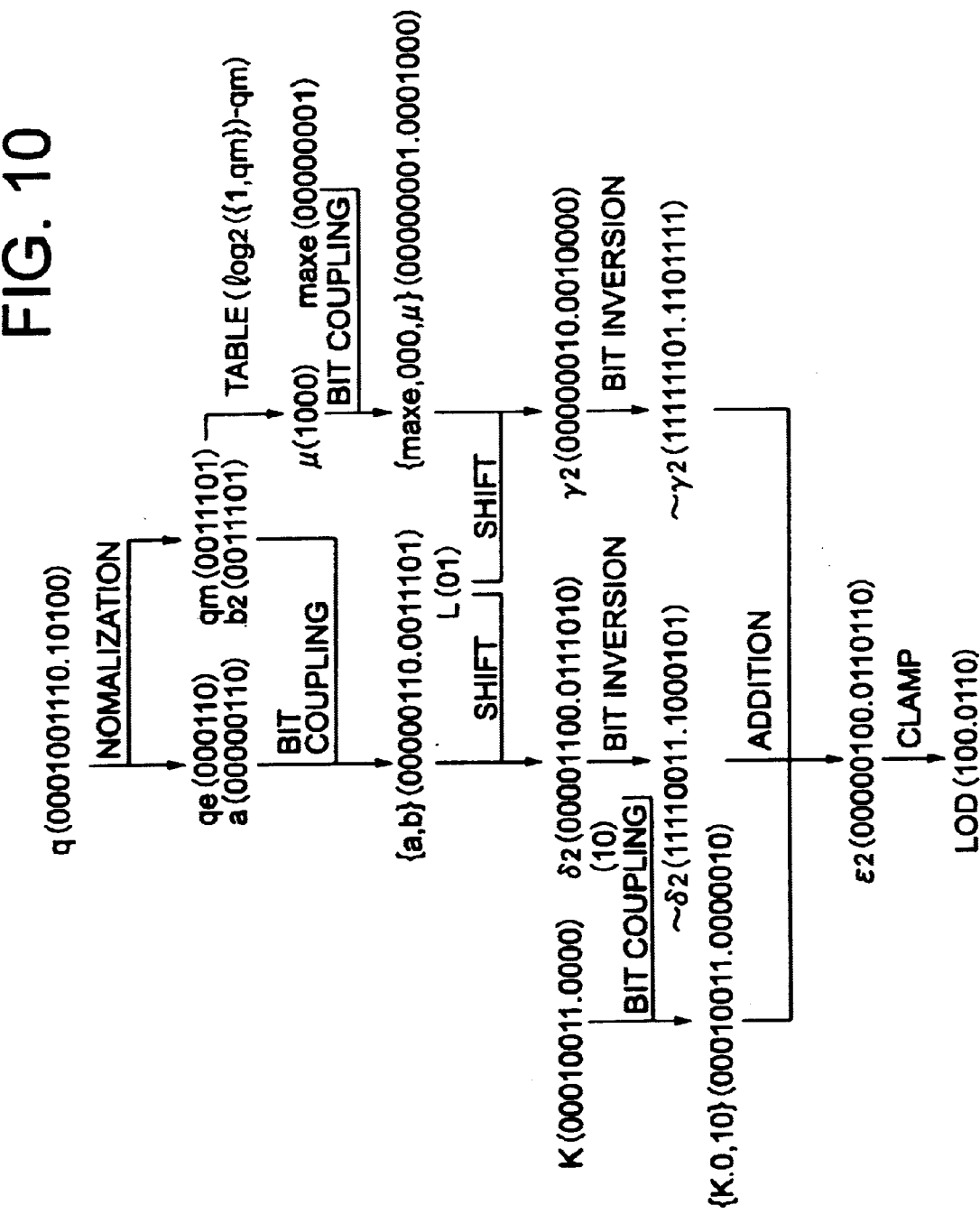
FIG. 10 is a view for explaining a concrete example of a reduction rate processing circuit shown in FIG. 9.

FIG. 10 is a view for explaining the processing in the reduction rate processing circuit 504 shown in FIG. 9.

Below, an explanation will be made of the operation of the reduction rate processing circuit 504 shown in FIG. 9 by using a concrete example and referring to FIG. 10.

Here, in the same way as the case explained above by using FIG. 6, a case where the processing of the equation (6) is carried out in the reduction rate processing circuit 504 will be illustrated by using the following values.

q=(0001001110.10100):
maxe=(00000001.0000000):
L=(01):
K=(00010011.0000):
q (0001001110.101000) of the q data S302 output by the q selection circuit 302 is input to the priority encoder 101 and the shift circuit 102 shown in FIG. 9.

Next, the priority encoder 101 finds the exponent qe (000110) of q (0001001110.10100), adds (00) to the MSB side of the related exponent qe (000110), and outputs the 8-bit data a (00000110) obtained.

Next, the shift circuit 102 shifts the a (0001001110.10100) toward the MSB side by exactly a (00000110) and outputs the mantissa qm (0011101) of the decimal part after the shift as the data b2 to the table 203.

Next, the table 203 obtains the 4-bit data $\mu$ ("$\log_2(\{1, qm\})-qm$" corresponding to the mantissa qm (0011101), that is, $\mu$ (1000), and outputs $\mu$ (1000).

Next, the data maxe (00000001) input from the triangle DDA circuit 11 and the data $\mu$(1000) are coupled by connecting (000) before the data $\mu$ so that the decimal part becomes 7 bits and using the result as the decimal part. The data {maxe, 3'b0, $\mu$}=(00000001.0001000) after the related bit coupling is output to the shift circuit 202.

Next, the shift circuit 202 the input data {maxe, 3'b0, $\mu$}=(00000001.0001000) toward the MSB by exactly the input data L=(01) and outputs the γ2(00000010. 0010000) of the result to the inverter 205.

Next, the inverter 205 inverts the data γ2 (00000010.0010000) and outputs the data ⁻γ2(11111101. 1101111) of the result of this to the adder circuit 206.

Further, the data a (00000110) output by the priority encoder 101 and the data b2 (0011101) output by the shift circuit 102 are bit coupled, and the data {a, b2}=(00000110. 0011101) of the result of this is output to the shift circuit 201.

Next, the shift circuit 201 shifts the data {a, b2}= (00000110.0011101) toward the MSB by exactly the input data L(01) and outputs the data δ2 (00001100.0111010) of the result of this to the inverter 204.

Next, the inverter 204 inverts the data δ2 (00001100.0111010) and outputs the data ⁻γ2 (11110011.1000101) of the result of this to the adder circuit 206.

Further, the data K (00010011.0000) and "10" are coupled by adding one bit of "0" before "10" so that the decimal part becomes 7 bits, and the data {K, 3'b0, 10}= (00010011.0000010) after the related bit coupling is output to the adder circuit 206.

Next, the adder circuit 206 adds the data {K, 3'b0, 10}, the data ⁻δ2, and the data ⁻γ2 and outputs the ε2

(00000100.0110110) of the result of the addition to the clamp circuit 109.

Next, the clamp circuit 109 clamps (rounds) the data $\epsilon 2$ input from the adder circuit 206 to data comprised by 3 bits of an integer part and 4 bits of a decimal part and outputs (100.0110) of the result of this to the texture data reading circuit 305 shown in FIG. 8 as the reduction rate LOD.

Third Embodiment

Figure 11:
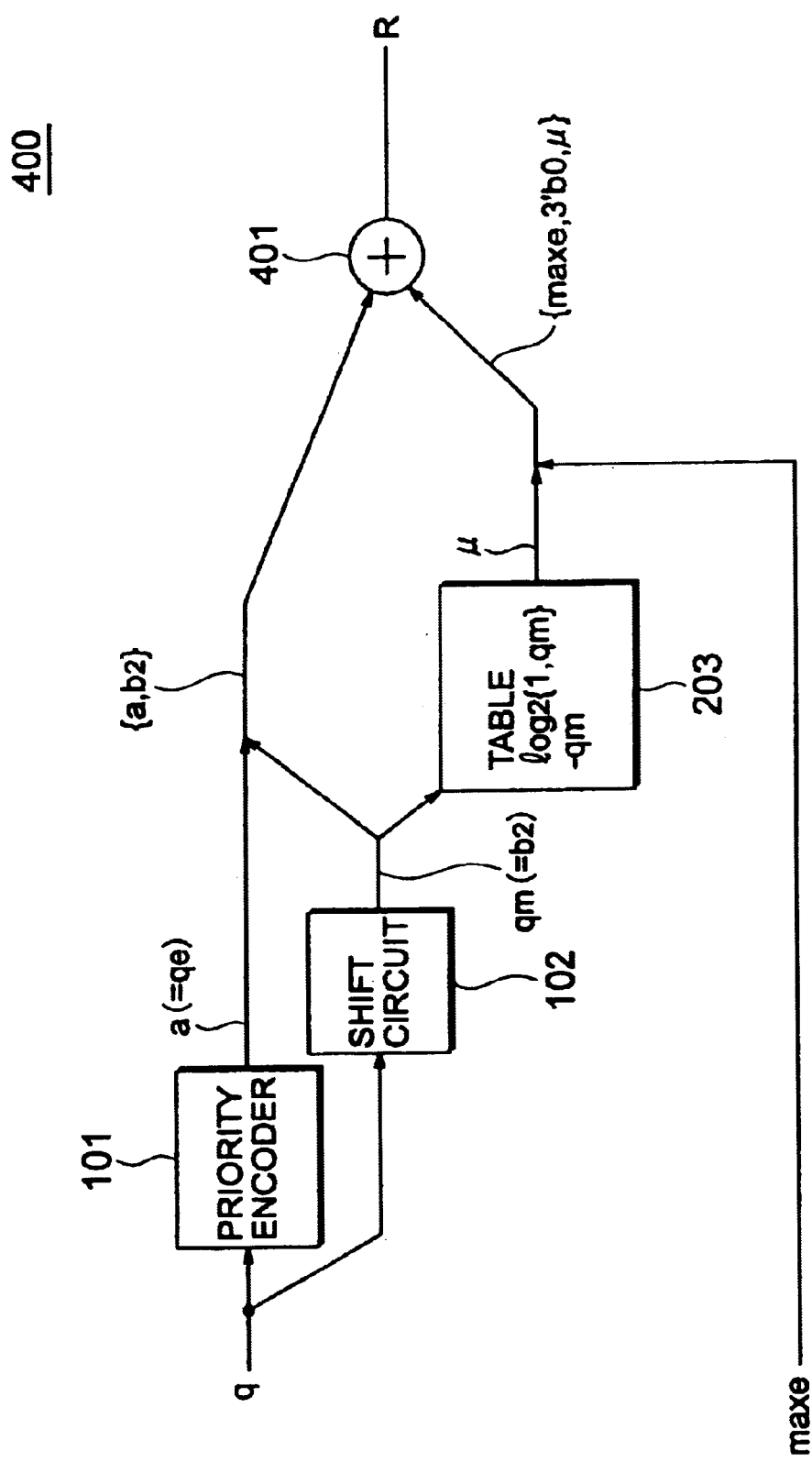
FIG. 11 is a view of the configuration of a processing circuit according to a third embodiment of the present invention.

FIG. 11 is a view of the configuration of a processing circuit 400 of the present embodiment.

The processing circuit 400 is a processing circuit for performing the operation shown in the following equation (11).

$$R = \log_2(1/q) + \max e \qquad (11)$$

where, q is a data comprised by 10 bits of an integer part and 5 bits of a decimal part and a sign (signed), and maxe is a data comprised by 8 bits of an integer part and with no sign (unsigned).

As shown in FIG. 11, the processing circuit 400 has the priority encoder 101, shift circuit 102, table 203, and the adder circuit 206.

The processing circuit 400 corresponds to the processing circuit of claim 1, the priority encoder 101 and the shift circuit 102 correspond to the normalization circuit, the table 203 corresponds to the data output circuit, and an adder circuit 401 corresponds to the adder circuit.

The priority encoder 101 finds the logarithm of 2 value "$\log_2 q$" of the input data q and outputs the integer value "int($\log_2 q$)" of the logarithm of 2 "$\log_2 q$", that is, the exponent qe, as the data a.

The shift circuit 102 shifts the input data q toward the LSB by exactly the exponent qe input from the priority encoder 101 and outputs the data qm of the decimal part of the result as the data b2.

The data a output by the priority encoder 101 and the data b2 output by the shift circuit 102 are bit coupled, and the data {a, b2} of the result of this is output to the adder circuit 401.

The table 203 is provided with a correspondence table between the data qm and "$\log_2(\{1, qm\}) - qm$", acquires "$\log_2(\{1, qm\}) - qm$" corresponding to the related data qm from the correspondence table using the data qm (=b2) input from the shift circuit 102 as a key, and outputs this as the data $\mu$.

Note that it is also possible to use a program automatically generating "$\log_2(\{1, qm\}) - qm$" by using the input data qm in place of the table 203.

The input data maxe and the data $\mu$ output from the table 203 are coupled using the data maxe as the integer part and connecting (000) before the data $\mu$ so that the decimal part becomes 7 bits and using this as the decimal part. The data {maxe, 3'b0, $\mu$} after the related bit coupling is output to the adder circuit 401.

The adder circuit 401 adds the data {a, b2} and the data {maxe, 3'b0, $\mu$} and outputs the result of this as a data R.

The processing circuit 400 uses the table 203 shown in FIG. 9 for outputting $\mu$ (="$\log_2(\{1, qm\}) - qm$") corresponding to the input data qm so as to bit couple the data maxe comprised by only an integer part and the data $\mu$ comprised by only a decimal part and thereby reduce the addition concerning the data maxe.

Due to this, a reduction of the number of gates and an increase of the speed of processing can be achieved compared with the case where the adder circuit for performing the addition concerning the data maxe is provided.

The present invention is not limited to the above embodiments.

In the embodiments, the cases where the processing circuits shown in FIG. 4 and FIG. 9 were used as the reduction rate processing circuits were exemplified, but it is also possible to use these circuits in other devices for performing similar operations.

For example, in the computer graphic system 1 shown in FIG. 1, the case where geometry processing for generating the polygon rendering data was carried out in the main processor 4 was exemplified, but a configuration performing this in the rendering circuit 5 can also be adopted.

Summarizing the effects of the invention, as explained above, according to the processing circuit of the present invention, the operations of equation (1) and equation (2) can be carried out by a small scale circuit configuration at a high speed.

Also, according to the processing circuit of the present invention, by using a data outputting means receiving as its input qm and outputting "$\log_2(\{1, qm\}) - qm$", a high operation precision can be realized.

Further, according to the processing method of the present invention, an increase of the speed and an enhancement of the precision of the processing can be realized.

Furthermore, according to the image processor of the third aspect of the present invention, a high quality image display can be achieved with a small scale hardware configuration.

Still further, according to the image processor of the fourth aspect of the present invention, a new circuit configuration for calculating the reduction rate of the texture data can be provided.

While the invention has been described by reference to specific embodiments chosen for purposes of illustration, it should be apparent that numerous modifications could be made thereto by those skilled in the art without departing from the basic concept and scope of the invention.

What is claimed is:

1. A processing circuit for performing the operation shown in the following equation M=log2q+maxe using binary data q having an integer part and a decimal part and data maxe comprised by only an integer part and calculating a reduction ratio LOD using the data M, comprising:

a normalization circuit for normalizing the data q to generate an exponent qe and a mantissa qm;

a data outputting means for receiving as its input the mantissa qm and outputting data $\mu$ indicating "log2({1, qm})–qm" where {1, qm} indicates a bit coupling where "1" is the integer part and "qm" is the decimal part;

a first adder circuit for adding data obtained by bit coupling of the data qe and the qm and data obtained by bit coupling of the data maxe and the data $\mu$ and outputting data M;

a shift circuit for receiving data M and shifting the data M toward the MSB by a number indicated by data L;

a second adder circuit for adding the data from the shift circuit and data K; and a clamp circuit for clamping the data from the adder circuit to a predetermined number of bits to generate the reduction ratio LOD.

2. A processing circuit as set forth in claim 1, wherein said data outputting means:

has a correspondence table between said mantissa qm and said data $\mu$ and obtains said data $\mu$ corresponding to an input mantissa qm using said correspondence table and outputs the obtained data $\mu$.

3. A processing circuit as set forth in claim 1, wherein said data outputting means:
   has a program receiving as input said mantissa qm and generating said data $\mu$ and
   obtains said data $\mu$ corresponding to an input mantissa qm by processing according to said program and outputs the obtained data $\mu$.

4. A processing circuit for calculating data LOD by performing the clamp operation shown in the following equation LOD=Clamp (((log2) 1/q+maxe)<<L+K) using binary data q having an integer part and a decimal part, data maxe comprised by only an integer part, and data L and K, comprising:
   a normalization circuit for normalizing the data q to generate an exponent qe and a mantissa qm,
   a first shift circuit for shifting the data obtained by bit coupling of the data qe and the qm toward the most significant bit (MSB) by a value indicated by the data L,
   a first inversion circuit for inverting the output of the first shift circuit,
   a data outputting means for receiving as its input the mantissa qm and outputting data $\mu$ indicating "log2({1, qm})–qm" where {1, qm} indicates a bit coupling where "1" is the integer part and "qm" is the decimal part,
   a second shift circuit for shifting the data obtained by bit coupling of the data maxe and the data $\mu$ toward the MSB by exactly the value indicated by the data L,
   a second inversion circuit for inverting the output of the second shift circuit,
   an adder circuit for adding the data obtained by bit coupling of the data K and the binary number "10", the output of the first shift circuit and the output of the second shift circuit, and
   a clamp circuit for clamping the output of the adder circuit to a predetermined number of bits to generate the data LOD.

5. A processing circuit as set forth in claim 4, wherein said data outputting means:
   has a correspondence table between said mantissa qm and said data $\mu$ and
   obtains said data $\mu$ corresponding to an input mantissa qm using said correspondence table and outputs the obtained data $\mu$.

6. A processing circuit as set forth in claim 4, wherein said data outputting means:
   has a program receiving as input said mantissa qm and generating said data $\mu$ and
   obtains said data $\mu$ corresponding to an input mantissa qm by processing according to said program and outputs the obtained data $\mu$.

7. An image processor for expressing a 3D model by a combination of a plurality of unit graphics to which common processing conditions apply, determining a reduction rate from homogeneous coordinates (s, t) and a homogeneous term q contained in the image data for each pixel, and linking texture data according to the related determined reduction rate with the unit graphics, comprising:
   a storing means storing a plurality of texture data corresponding to different reduction rates,
   a representative point determining circuit for determining a pixel forming a representative point from among pixels located inside a unit graphic to be processed among a plurality of pixels to be simultaneously processed,
   a reduction rate calculation circuit for calculating a reduction rate LOD from the following equation LOD=Clamp (((log21/q)+maxe)<<L+K) using data maxe comprised by only an integer part indicating a maximum exponent of homogeneous coordinates (s, t) of the vertexes of a unit graphic being processed and the homogeneous term q, the homogeneous term q having an integer part and a decimal part corresponding to the determined representative point, and the data L and K, and
   a reading circuit for reading texture data from the storing means by using the calculated reduction rate LOD,
   wherein
   the reduction rate calculation circuit has
      a normalization circuit for normalizing the data q to generate an exponent qe and a mantissa qm,
      a first shift circuit for shifting the data obtained by bit coupling of the data qe and the qm toward the MSB by exactly the value indicated by the data L,
      a first inversion circuit for inverting the output of the first shift circuit,
      a data outputting means for receiving as its input the mantissa qm and outputting data $\mu$ indicating "log2({1, qm})–qm" where {1, qm} indicates a bit coupling where "1" is the integer part and "qm" is the decimal part,
      a second shift circuit for shifting the data obtained by bit coupling of the data maxe and the data $\mu$ toward the MSB by exactly the value indicated by the data L,
      a second inversion circuit for inverting the output of the second shift circuit,
      an adder circuit for adding the data obtained by bit coupling of the data K and the binary number "10", the output of the first shift circuit and the output of the second shift circuit, and
      a clamp circuit for clamping the output of the adder circuit to a predetermined number of bits to generate the dat LOD.

8. An image processor as set forth in claim 7, wherein only the results of processing of pixels positioned inside a unit graphic being processed among the plurality of pixels being simultaneously processed are used as valid.

9. An image processor as set forth in claim 7, wherein said reading means reads texture data corresponding to each pixel from a reference address corresponding to the determined reduction rate LOD in a storage area of said storing means and an address in the texture corresponding to the homogeneous coordinates (s, t) and the homogeneous term q.

10. An image processor for expressing a 3D model by a combination of a plurality of unit graphics to which common processing conditions apply, determining a reduction rate from homogeneous coordinates (s, t) and a homogeneous term q contained in the image data for each pixel, and linking texture data according to the related determined reduction rate with the unit graphics, comprising:
   a storing means storing a plurality of texture data corresponding to different reduction rates,
   a representative point determining circuit for determining a pixel forming a representative point from among pixels located inside a unit graphic to be processed among a plurality of pixels to be simultaneously processed,
   a reduction rate calculation circuit for calculating a reduction rate LOD from the following equation LOD=

Clamp $(((\log_2 1/q)+\text{maxe})<<L+K)$ using data maxe comprised by only an integer part indicating a maximum exponent of homogeneous coordinates (s, t) of the vertexes of a unit graphic being processed and the homogeneous term q, the homogeneous term q having an integer part and a decimal part corresponding to the determined representative point, and the data L and K, and a reading circuit for reading texture data from the storing means by using the calculated reduction rate LOD, wherein the reduction rate calculation circuit has:
- a normalization circuit for normalizing the data q to generate an exponent qe and a mantissa qm,
- a data outputting means for receiving as its input the mantissa qm and outputting data b indicating "$\log_2(\{1, qm\})$" where $\{1, qm)$ indicates a bit coupling where "1" is the integer part and "qm" is the decimal part,
- a first inversion circuit for inverting the data obtained by bit coupling of the data qe and the data b,
- a second inversion circuit for inverting the data maxe,
- a first adder circuit for adding the binary number "10", the output of the first inversion circuit, and the output of the second inversion circuit,
- a shift circuit for shifting the output of the first adder circuit toward the MSB by exactly the value indicated by the data L,
- a second adder circuit for adding the output of the shift circuit and the data K, and
- a clamp circuit for clamping the output of the adder circuit to a predetermined number of bits to generate the data LOD.

11. A processing method for performing the operation shown in the following equation $M=\log_2 q+\text{maxe}$ and calculating a reduction ratio LOD using the data M, using a normalization circuit, data outputting means, a first adder circuit, a shift circuit, a second adder circuit, a clamp circuit, binary data q having an integer part and a decimal part and data maxe comprised by only an integer part, comprising the steps of:

using the normalization circuit to normalize the data q to generate an exponent qe and a mantissa qm, using the data outputting means to obtain data $\mu$ indicating "$\log_2(\{1, qm\})-qm$", where $\{1, qm\}$ indicates a bit coupling where "1" is the integer part and "qm" is the decimal part, corresponding to the mantissa qm by using a correspondence table between the mantissa qm and the data $\mu$ or a program for generating the data $\mu$ by inputting the mantissa qm, using the first adder circuit to add the data obtained by bit coupling of the data qe and qm and the data obtained by bit coupling of the data maxe and the data $\mu$ to calculate the data M;

using the shift circuit to shift the data M toward the MSB by a number indicated by data L;

using the second adder circuit to add the data from the shift circuit and data K; and using the clamp circuit to clamp the data from the adder circuit to a predetermined number of bits to generate the reduction ratio LOD.

\* \* \* \* \*

UNITED STATES PATENT AND TRADEMARK OFFICE
CERTIFICATE OF CORRECTION

PATENT NO.     : 6,693,634 B1
DATED          : February 17, 2004
INVENTOR(S)    : Tatsumi Mitsushita It is certified that error appears in the above-identified patent and that said Letters Patent is hereby corrected as shown below:

Title page,
Item [57], ABSTRACT,
Line 4, delete "g data" and insert -- q data --.

Columns 1 through 11,
Every incidence of a stand alone "g" should be changed to -- q --.
Every incidence of "ge" should be changed to -- qe --.
Every incidence of "gm" should be changed to -- qm --.

Column 3,
Line 11, delete "shaft" and insert -- shift --.
Line 48, delete "a" and insert -- an --.

Column 11,
Line 33, delete "(0000000.1.0000000)" and insert -- (00000001.0000000) --.

Signed and Sealed this

Seventeenth Day of August, 2004

JON W. DUDAS
*Acting Director of the United States Patent and Trademark Office*